United States Patent
Kumon

(10) Patent No.: US 10,346,118 B2
(45) Date of Patent: Jul. 9, 2019

(54) ON-VEHICLE OPERATION DEVICE

(71) Applicant: TOYOTA JIDOSHA KABUSHIKI KAISHA, Toyota-shi, Aichi-ken (JP)

(72) Inventor: Hitoshi Kumon, Aichi-ken (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 15/723,830

(22) Filed: Oct. 3, 2017

(65) Prior Publication Data

US 2018/0101351 A1    Apr. 12, 2018

(30) Foreign Application Priority Data

Oct. 6, 2016    (JP) .................................. 2016-197892

(51) Int. Cl.

| | |
|---|---|
| *G06F 3/14* | (2006.01) |
| *G01C 21/36* | (2006.01) |
| *G06F 3/0484* | (2013.01) |
| *G06F 3/0488* | (2013.01) |
| *G06F 1/16* | (2006.01) |
| *G06F 3/041* | (2006.01) |
| *G06F 3/0354* | (2013.01) |

(52) U.S. Cl.
CPC ....... *G06F 3/1423* (2013.01); *G01C 21/3664* (2013.01); *G06F 1/1692* (2013.01); *G06F 3/03547* (2013.01); *G06F 3/0416* (2013.01); *G06F 3/0488* (2013.01); *G06F 3/04842* (2013.01); *G06F 3/04886* (2013.01); *G06F 3/041* (2013.01); *G06F 2203/04104* (2013.01)

(58) Field of Classification Search
None
See application file for complete search history.

(56) References Cited

U.S. PATENT DOCUMENTS

| | | | |
|---|---|---|---|
| 2009/0160803 A1 | 6/2009 | Hashimoto | |
| 2009/0256813 A1* | 10/2009 | Amici | B60K 35/00 345/173 |

(Continued)

FOREIGN PATENT DOCUMENTS

| | | |
|---|---|---|
| JP | 2009151691 A | 7/2009 |
| JP | 2012253736 A | 12/2012 |

(Continued)

*Primary Examiner* — Duane N Taylor, Jr.
(74) *Attorney, Agent, or Firm* — Hunton Andrews Kurth LLP

(57) ABSTRACT

An on-vehicle operation device includes an operation unit, a first display device, a second display device and an electronic control unit. The electronic control unit is configured to control the second display to display a plurality of second images each indicating a second predetermined function and calculate a distance or a length of a trajectory between a first position and a second position. The first position corresponds to a first coordinate starting the touch input at the operation unit. The second position corresponds to a second coordinate ending the touch input at the operation unit. The electronic control unit is configured to perform an off trigger including execution of the second predetermined function associated with the second position when the distance or the length of the trajectory is equal to or smaller than the predetermined value.

10 Claims, 13 Drawing Sheets

(56) References Cited

U.S. PATENT DOCUMENTS

| | | | |
|---|---|---|---|
| 2009/0307588 A1* | 12/2009 | Tauchi | G06F 3/016 |
| | | | 715/702 |
| 2012/0013548 A1* | 1/2012 | Choi | B60K 35/00 |
| | | | 345/173 |
| 2014/0111454 A1 | 4/2014 | Hosoi et al. | |
| 2015/0067574 A1* | 3/2015 | Okita | G06F 3/0488 |
| | | | 715/773 |
| 2015/0185843 A1* | 7/2015 | Olien | B60W 50/16 |
| | | | 345/174 |
| 2016/0001693 A1* | 1/2016 | Tamura | G01C 21/3632 |
| | | | 340/441 |
| 2017/0017312 A1 | 1/2017 | Shikata et al. | |
| 2017/0154608 A1 | 6/2017 | Hamaguchi | |
| 2017/0322760 A1* | 11/2017 | Soh | B60R 11/0235 |
| 2018/0239441 A1* | 8/2018 | Osugi | G06F 3/0338 |
| 2018/0260096 A1* | 9/2018 | Kamiya | G06F 3/038 |

FOREIGN PATENT DOCUMENTS

| | | |
|---|---|---|
| JP | 2015-172844 A | 10/2015 |
| JP | 2016-004482 A | 1/2016 |
| JP | 2016099891 A | 5/2016 |

* cited by examiner

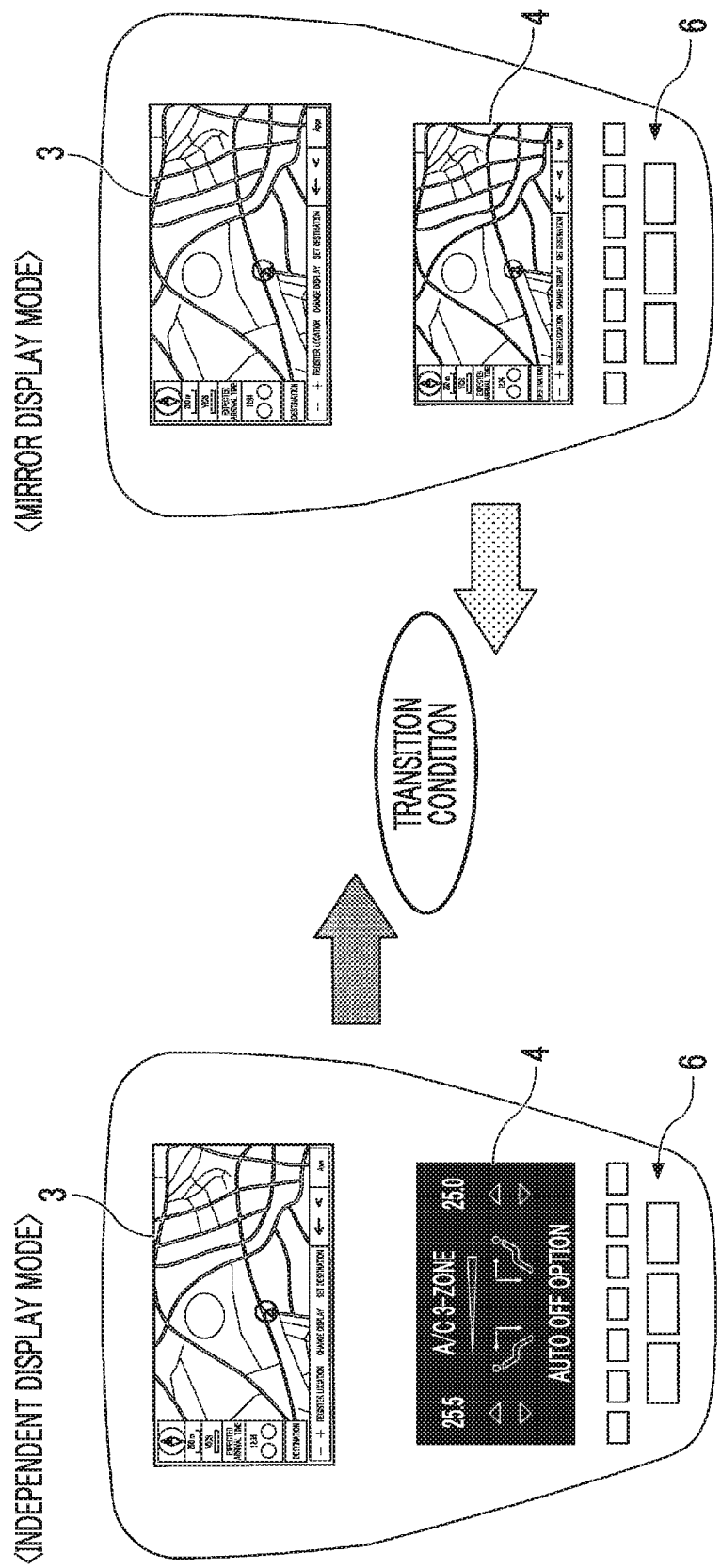

FIG. 7
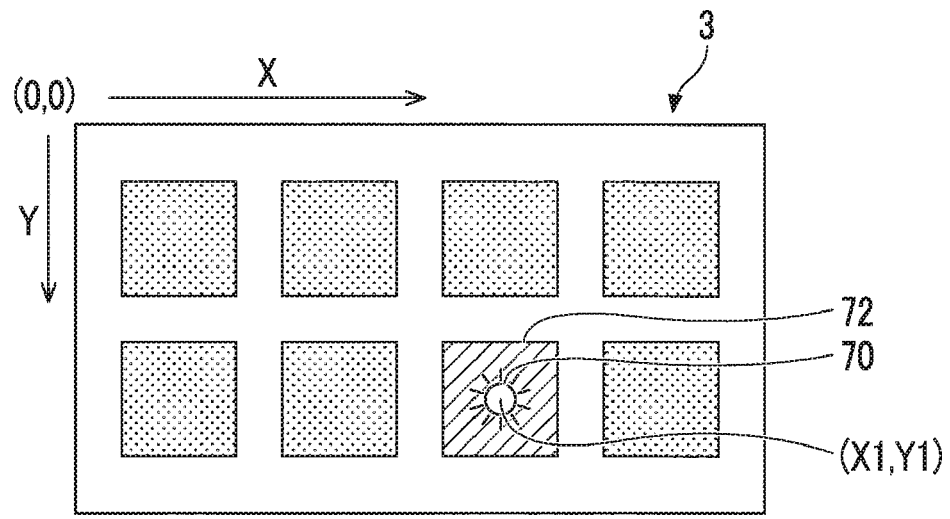
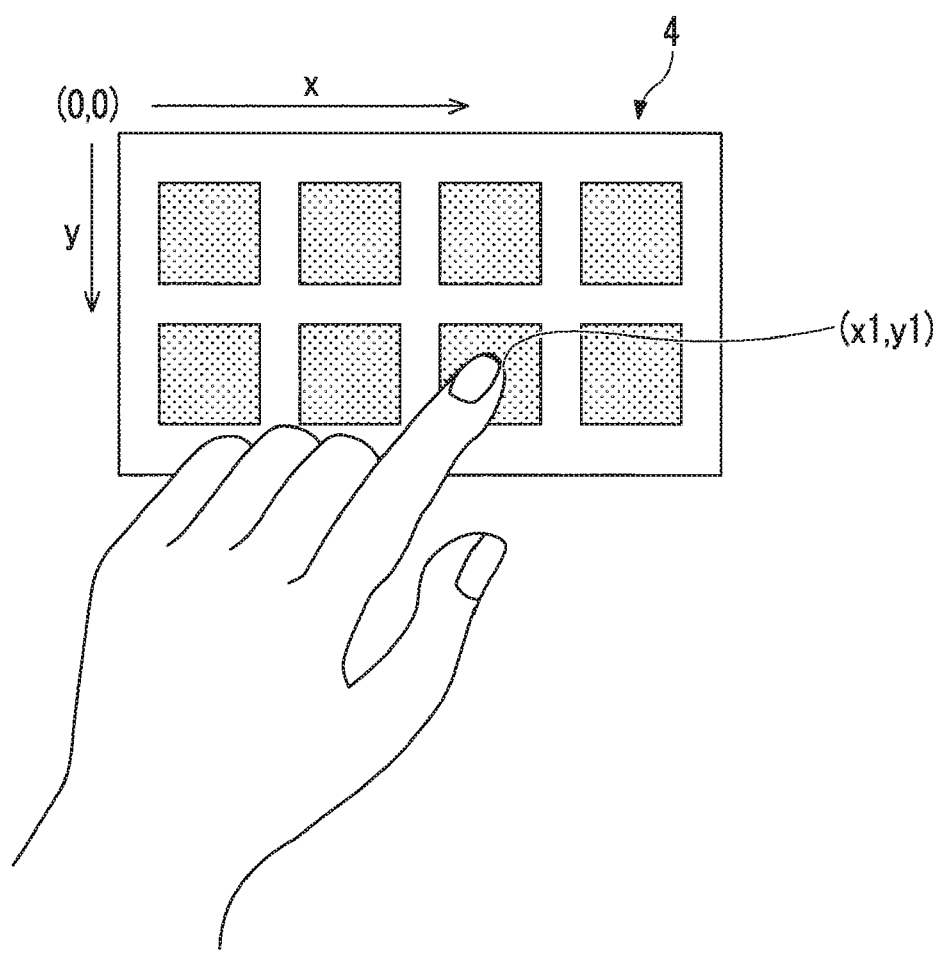

FIG. 8
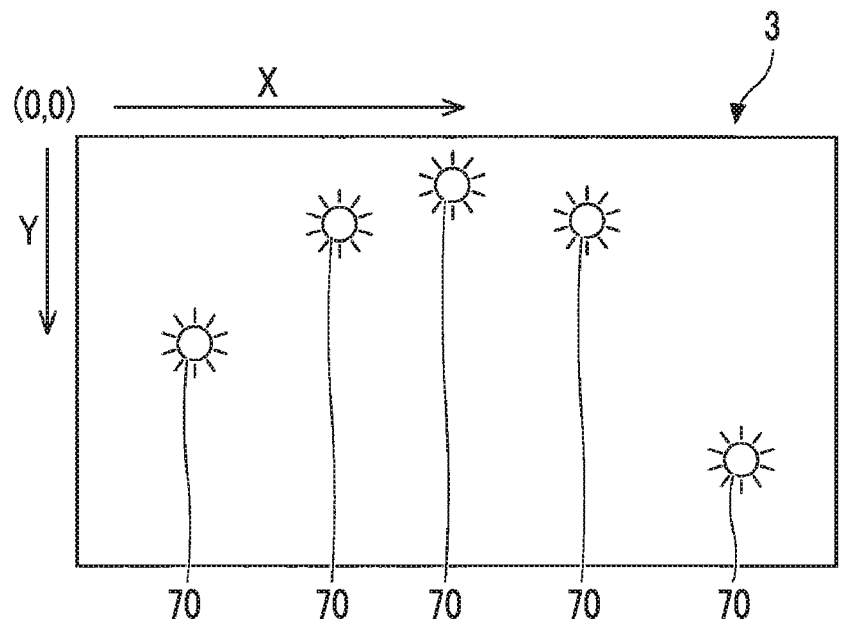
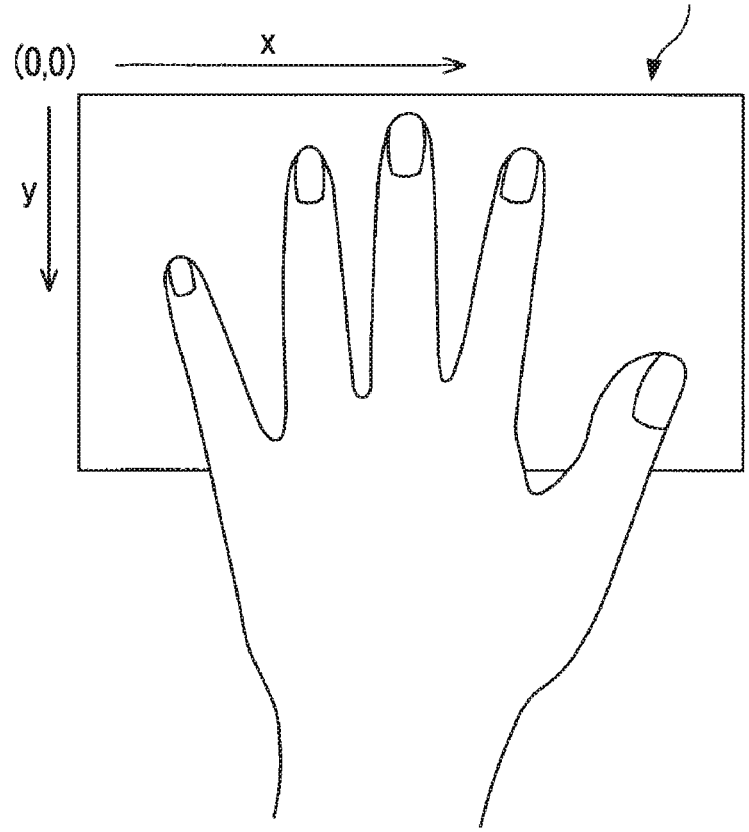

FIG. 9

IMAGE ID = 00001

| DEFINITION PART ID | POSITION OF DEFINITION PART | TYPE OF OPERATION INPUT | OPERATION SIGNAL | DESTINATION OF OPERATION SIGNAL |
|---|---|---|---|---|
| 00001 | (xx10 TO xx11, yy10 TO yy11) | OFF-TRIGGER TYPE INPUT | DISPLAY TRANSITION COMMAND A | MULTIMEDIA DEVICE |
| 00003 | (xx30 TO xx31, yy30 TO yy31) | FLICK | DOWN SCROLL COMMAND | MULTIMEDIA DEVICE |
| ... | ... | ... | ... | ... |

IMAGE ID = 00002

| DEFINITION PART ID | POSITION OF DEFINITION PART | TYPE OF OPERATION INPUT | OPERATION SIGNAL | DESTINATION OF OPERATION SIGNAL |
|---|---|---|---|---|
| 00002 | (xx20 TO xx21, yy20 TO yy21) | OFF-TRIGGER TYPE INPUT | SETTING VALUE INCREASE COMMAND B & DISPLAY CHANGE COMMAND B | CAN(SETTING VALUE INCREASE COMMAND B) & DISPLAY CONTROL UNIT (DISPLAY CHANGE COMMAND B) |
| ... | ... | ... | ... | ... |

ON-VEHICLE OPERATION DEVICE

INCORPORATION BY REFERENCE

The disclosure of Japanese Patent Application No. 2016-197892 filed on Oct. 6, 2016 including the specification, drawings and abstract is incorporated herein by reference in its entirety.

BACKGROUND

1. Technical Field

The present disclosure relates to an on-vehicle operation device.

2. Description of Related Art

In relation to a touchpad arranged apart from a display device (hereinafter referred to as "remote touchpad"), the depression-operation supporting type is known. A remote touch pad of a depression-operation supporting type has a mechanism that allows the vertical movement of the touchpad itself and a unit (tact switch, pressure sensitive sensor, etc.) for detecting a depression operation on the touch pad (For example, Japanese Patent Application Publication No. 2015-172844 (JP 2015-172844 A)). Therefore, a remote touchpad of a depression-operation supporting type can detect not only the coordinates of a touch input but also the strength of a touch input related to a depression operation (for example, whether or not the magnitude of depression force exceeds a predetermined threshold).

Furthermore, in relation to an on-vehicle user interface (UI: User Interface) using two display devices (hereinafter referred to as "on-vehicle two-screen UI"), a technology in which each of the two display devices has a touch panel is known (for example, Japanese Patent Application Publication No. 2016-004482 (JP 2016-004482 A)).

SUMMARY

Meanwhile, on a remote touchpad of a depression-operation supporting type, the user can move a finger on the remote touchpad to select a desired function with a cursor and, then, perform a depression operation (that is, confirmation operation) on the remote touchpad to perform the selected function. In this way, the remote touchpad of a depression-operation supporting type enables two types of separate operations of selection and confirmation (set), thus ensuring high operability.

However, when a remote touchpad of a depression-operation non-supporting type is used instead of a depression-operation supporting type, only the coordinates of a touch input can be detected. Therefore, based on a touch input, it is difficult to perform the confirmation operation that is performed in place of the depression operation. This also applies to the on-vehicle two-screen UI. In the on-vehicle two-screen UI, the function related to an image output on one of the two display devices can be realized by an operation on the other display device. In this case, the touch panel of the other display device has substantially the same role as that of a remote touchpad. However, when a touch panel configured to detect only the coordinates of a touch input is used on the other display device, it is also difficult to enable a confirmation operation, which is performed in place of "the depression operation on the remote touchpad", based a touch input. Furthermore, in the on-vehicle two-screen UI, it is conceivable that the user watches the one of the display devices and, at the same time, performs an operation on the other display device. In this case, because there is a low possibility that the cursor is output at a user-desired position at the start of the first touch input, it may be inconvenient to perform the confirmation operation based on a touch input.

The present disclosure makes it possible to perform the confirmation operation for a function, related to an image output on a display device, while using an operation unit configured to detect only the coordinates of a touch input.

According to an aspect of the present disclosure, an on-vehicle operation device is provided. An on-vehicle operation device according to the aspect includes: an operation unit configured to detect coordinates of a touch input; a first display device; a second display device located at a position higher than the operation unit and away from a driver's seat of the vehicle compared to the operation unit; and an electronic control unit. The electronic control unit is configured to control the second display to display a plurality of second images each indicating a second predetermined function, calculate a distance or a length of a trajectory between a first position and a second position, the first position corresponding to a first coordinate starting the touch input at the operation unit, the second position corresponding to a second coordinate ending the touch input at the operation unit, and perform an off trigger including execution of the second predetermined function associated with the second position when the distance or the length of the trajectory is equal to or smaller than a predetermined value.

In the above aspect, the second predetermined function represented by the second image output to the second display device can be selected and confirmed by an operation on the operation unit arranged away from the second display device (hereinafter also referred to as "remote touchpad type operation").

More specifically, the electronic control unit performs the off trigger based on a touch input whose distance between the coordinates at the start of a touch input and the coordinates at the end of the touch input, or whose distance that follows the trajectory of the coordinates from the start of a touch input to the end of the touch input, is smaller than or equal to a predetermined value (in the description below, this distance is also referred to as an "on-off trigger distance" without discriminating between the two distances described above). As described above, according to the aspect, a touch input whose on-off trigger distance is equal to or smaller than the predetermined value becomes an input that causes the off trigger, that is, an input that is performed in place of the "depression operation on the remote touchpad" for enabling the simultaneous execution of the selection operation and the confirmation operation. Accordingly, when performing an operation on the operation unit while watching a second image on the second display device, the user (for example, driver) can determine whether to end the touch input by looking at the output position of the predetermined image (for example, the form of a mark) in the second image. For example, when the predetermined image is output at a desired position in the second image at the start of a touch input, the user can immediately release the finger to terminate the touch input, thereby causing the off trigger.

In the above aspect, the electronic control unit may be configured to control the second display device to display a predetermined image over the second image from the start and until the end of the touch input.

According to the configuration described above, the operation feeling at a remote touchpad type operation time becomes almost similar to that at an operation time of the "existing single touch-panel equipped display device", providing operability that is familiar to the user who is familiar with the "existing single touch-panel equipped display device". The "existing single touch-panel equipped display device", which usually does no output a guide display such as a cursor, allows the user to perform a direct operation.

In the above aspect, the predetermined image may be in a form of a mark or a cursor.

According to the configuration described above, the predetermined image can be output in the form of a mark or a cursor the position of which is easily understood by the user.

In the above aspect, the predetermined image may be in a form of a mark. When a plurality of the touch inputs is detected simultaneously, the electronic control unit may be configured to output the predetermined image at a position corresponding to each of the plurality of touch inputs in the second image.

According to the configuration described above, the user can easily know the start position of the second touch input that can realize a desired second predetermined function based on the output positions of the plurality of predetermined images. This is a preferable function when a relatively large number of second images, each representing a second predetermined function, are output.

In the above aspect, the electronic control unit may be configured to calculate a third position corresponding to the first coordinates in the second image and a fourth position corresponding to the second coordinates in the second image, by using a predetermined conversion formula based on a relationship between a coordinate system of an operation unit and a coordinate system of the second image.

According to the configuration described above, the correspondence relationship between absolute-coordinate systems allows the user to intuitively determine the start position of a desired touch input, improving operability.

In the above aspect, a scale size in a first direction and a second direction of the operation unit may be equal to a scale size in the first direction and the second direction of the second display device. The first direction and the second direction may cross each other.

In the above aspect, the operation unit may be a touch panel, and the electronic control unit may be configured to output a first image on the first display device.

According to the configuration described above, the remote touchpad type operation can be performed via the on-vehicle two-screen UI.

In the above aspect, the electronic control unit may have a first mode and a second mode. In the first mode, the electronic control unit may be configured to output a first mode image as the first image. The first mode image may display a first predetermined function different from the second predetermined function. The first mode image may be independent of the second image output on the second display device. In the second mode, the electronic control unit may be configured to output a second mode image as the first image. The second mode image may have the same appearance as an appearance of the second image output on the second display device. In the second mode, the electronic control unit may be configured to perform the off trigger when the distance or the length of the trajectory is equal to or smaller than the predetermined value, and may be configured not to perform the off trigger when the distance or the length of the trajectory is larger than the predetermined value.

In the above aspect, in the first mode, the electronic control unit may be configured to perform the first predetermined function associated with the second coordinates based on the second coordinates.

According to the configuration described above, in the first mode, a first mode image independent of a second image output on the second display device is output on the first display device and, in the second mode, a second mode image having the same appearance as that of a second image output on the second display device is output on the first display device. Therefore, the user can perform not only the operation in the second mode (remote touchpad type operation) but also the operation in the first mode (hereinafter, "independent display operation"). The independent display operation is an operation that is performed while directly viewing the first display device. In the first mode, the user can implement the first predetermined function represented by the first mode image (for example, change of setting value) by an operation on the first display device. In the first mode, this ability enables the user to perform the operation, related to the first mode image independent of the second image, on the first display device while placing the second image in a visible state on the second display device. Therefore, in the first mode, the user can maintain the second image in a visible state on the second display device regardless of what operation is performed on the first display device during traveling and, thus, convenience is good.

In the above aspect, the second image may include a navigation image.

According to the configuration described above, the user can perform the remote touchpad type operation, related to a navigation image, while viewing the navigation image on the second display device.

In the above aspect, the electronic control unit may be configured not to perform the off trigger when the distance or the length of the trajectory is larger than the predetermined value.

According to the configuration described above, when the predetermined image is output at a position different from a desired position in the second image at the start of a touch input, the user can trace the distance, equal to or larger than the predetermined value, without releasing the finger for ending the touch input to prevent the touch input from causing the off trigger. In this manner, by adjusting the on-off trigger distance, the user can prevent the off trigger from occurring with any touch input. In the description below, such a function is referred to as a "touch input cancellation function". In the remote touchpad type operation, there is a low possibility that the predetermined image is output at a desired position in the second image at the start of the first touch input. This means that the touch input cancellation function is useful when starting the remote touchpad type operation. On the other hand, by looking at the predetermined image output in the second image and, when the predetermined image reaches a desired position, releasing the finger (that is, for ending the touch input), the user can know the start position of the second touch input, which implements a desired second predetermined function, while activating the touch input cancellation function. That is, when the user releases the finger and then starts the second touch input at that position, there is a high possibility that the predetermined image is output at the desired position in the second image. In this way, the touch input cancellation function becomes a selection assistance function when the user selects a desired second predetermined function, further increasing operability. By providing this touch input cancellation function, a touch input causing the off trigger is limited only to a touch input whose on-off trigger distance is equal to or smaller than the predetermined value. A touch input whose on-off trigger distance is equal to or smaller than the predetermined value is more likely to strongly express the user's operation intention than a touch input whose on-off trigger distance is larger than the predetermined value. Therefore, such a touch input can be suitably used as an input for accepting a user's confirmation intention.

The present disclosure makes it possible to perform the confirmation operation for a function, related to an image output to a display device, while using an operation unit configured to detect only the coordinates of a touch input.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 5 is a state transition diagram showing an example of a transition condition between an independent display mode and a mirror display mode;

FIG. 7 is a diagram showing a coordinate relationship (predetermined conversion formula) between a touch panel 5 and the screen of an upper display device 3;

FIG. 8 is a diagram showing a multipoint mark output function;

FIG. 9 is a diagram showing an example of Graphical User Interface (GUI) information;

DETAILED DESCRIPTION OF EMBODIMENTS

An embodiment will be described in detail below with reference to the drawings. In the description below, an "image" is a concept including a video. That is, a video is one type of an image.

Figure 1:
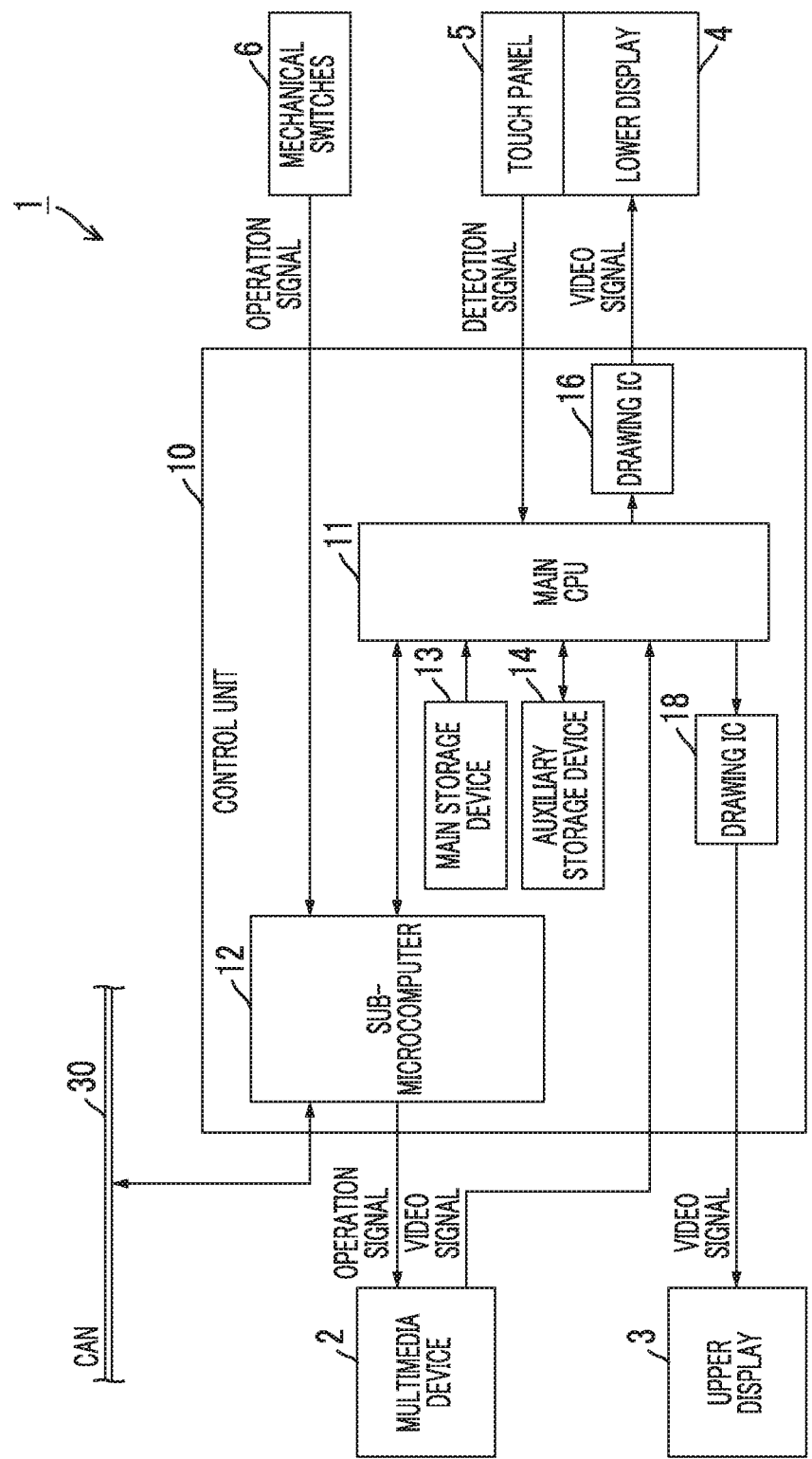
FIG. 1 is a diagram showing an example of an on-vehicle operation device 1 according to one embodiment.
Figure 2:
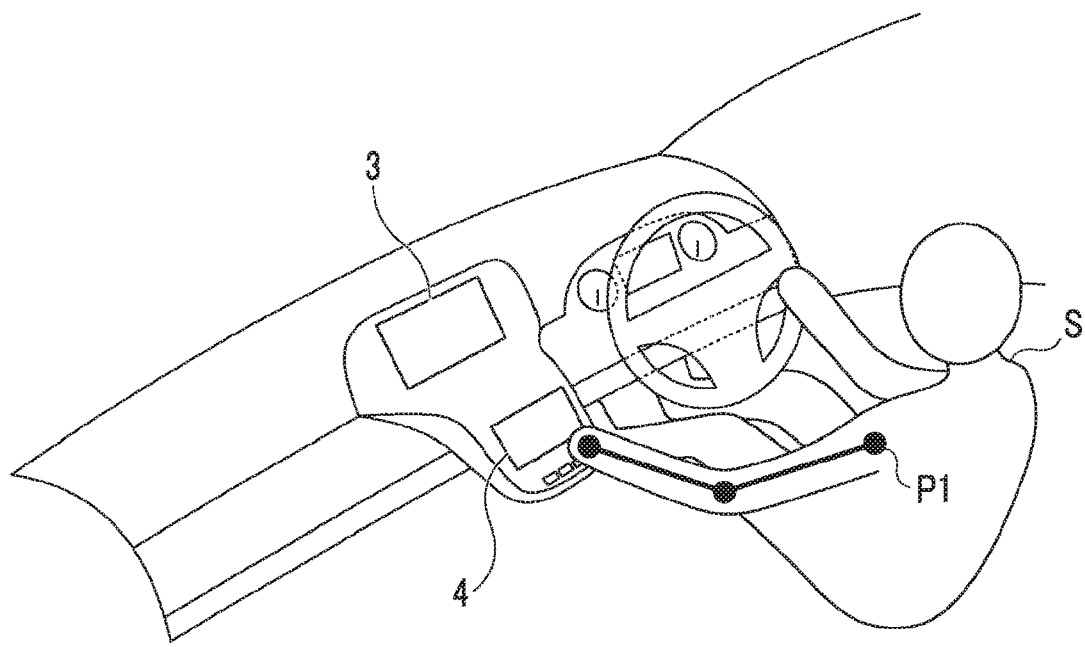
FIG. 2 is a diagram showing an example of the mounting state of an upper display device 3 and a lower display device 4.

FIG. 1 is a diagram showing an example of an on-vehicle operation device 1 according to one embodiment. FIG. 2 is a diagram showing an example of the mounting state of an upper display device 3 and a lower display device 4.

The on-vehicle operation device 1 realizes an on-vehicle two-screen UI with the following configuration. As shown in FIG. 1, the on-vehicle operation device 1 includes a multimedia device 2, the upper display device 3 (an example of a second display device), the lower display device 4 (an example of a first display device), a touch panel 5 (an example of an operation unit), mechanical switches (hard switches) 6, and a control unit 10.

The multimedia device 2 includes various devices of a multimedia system such as a navigation device and an audio device. The multimedia device 2 includes a computer (not shown) as a hardware resource.

The multimedia device 2 outputs a user interface image (hereinafter also referred to as "upper image") to the upper display device 3. The multimedia device 2 outputs an upper image, selected from the plurality of types of upper images, to the upper display device 3. An upper image, selected from the plurality of types for output, is selected basically by the user (for example, the driver). In a specific case, an upper image may be automatically selected as the default.

In this embodiment, the multimedia device 2 outputs, for example, an upper image, selected from the plurality of types of upper images prepared for operating the multimedia device 2, to the upper display device 3. More specifically, the plurality of types of upper images include a navigation image, an image related to the audio device (image indicating track numbers, etc.), an image related to a phone and mail, and so on. Each of the plurality of types of upper images may have a layer structure having lower-layer images. For example, a navigation image may have a layer structure in which the map image is in the highest layer and the image for setting the destination and the image for setting the display of the peripheral facilities are in the lower layer.

The multimedia device 2 generates a video signal related to the upper image to be outputted to the upper display device 3 and sends the video signal to the control unit 10. For example, when a map image, which is a navigation image, has been output to the upper display device 3, the multimedia device 2 generates a video signal for updating the map image according to a change in the current position of the vehicle and sends the generated video signal to the control unit 10.

The multimedia device 2 receives an operation signal from the control unit 10. The operation signal is generated when one of the mechanical switches 6 is operated for input or an input operation is performed on the touch panel 5. The multimedia device 2 performs the processing according to the operation signal based on the received operation signal. For example, the multimedia device 2 performs various types of processing, such as screen transition from a navigation image to another type of image (for example, an image related to the audio device), enlargement of a map in a navigation image, and route search. The multimedia device 2 generates a video signal based on the processing result and sends the generated video signal to the control unit 10.

The upper display device 3 is a display device such as a liquid crystal display. In this embodiment, an on-vehicle type display is used as an example of the upper display device 3. Unlike the lower display device 4, the upper display device 3 does not have a touch panel in this embodiment. This leads to a reduction in the cost of the upper display device 3 (the cost associated with the touch panel) and an increase in the degree of freedom in the arrangement of the upper display device 3 (because there is no need to consider operability). However, in a modification, the upper display device 3 may have a touch panel.

The upper display device 3 is arranged away from the lower display device 4. In this embodiment, the upper display device 3 is arranged higher than the lower display device 4 and farther away from the driver's seat. As shown in FIG. 2, the upper display device 3 is provided at a position where the driver S is easy to see it during driving. The distance from the driver's seat can be determined by the distance from the shoulder point P1 (design value) of the driver S. On the other hand, the lower display device 4 is arranged at a position where the driver S can easily reach it and extend his/her hand to it during driving, as shown in FIG. 2. From the viewpoint of operability during driving, it is more advantageous as the position of the lower display device 4 is lower when the distance (reach distance) from the shoulder point P1 (FIG. 2) of the driver S is the same, because the muscle load at driving time becomes low. On the other hand, from the viewpoint of visibility during driving, it is less advantageous as the position of the lower display device 4 is lower. As will be described later, a navigation image can be output on the lower display device 4 as a mirror display mode image (described later). Therefore, for ensuring necessary visibility for the map image, the lower display device 4 is preferably arranged at a position where the depression angle from the viewpoint of the driver S (depression angle in the downward direction with respect to the horizontal plane) is not significantly larger than 30 degrees. Although incorporated in the instrument panel in the example shown in FIG. 2, the upper display device 3 may be placed on the upper part of the instrument panel.

As shown in FIG. 1, the video signal is sent from the control unit 10 to the upper display device 3. The video signal sent to the upper display device 3 is generated by the control unit 10 based on the video signal received from the multimedia device 2. The upper display device 3 displays an upper image based on the video signal received from the control unit 10.

The lower display device 4 is a display device such as a liquid crystal display. In this embodiment, an on-vehicle type display is used as an example of the lower display device 4.

The touch panel 5 is provided on the lower display device 4. That is, the lower display device 4 is a display device having the touch panel 5. The touch panel 5 is configured to detect only the coordinates of a touch input. As the touch panel 5 of this type, there are several types, such as a touch panel that uses the electrostatic method for detecting the coordinates of a touch input based on a change in electrostatic capacitance generated by a touch input, or a touch panel that uses the small-pressure-sensitive method for detecting the strength of a touch input based on a small pressure generated by a touch input. The touch panel 5 in this embodiment does not employ a combination of the electrostatic method and the pressure sensitive method. In other words, the touch panel 5 of this type cannot detect the strength of a touch input. In contrast, a touch panel employing a combination of the electrostatic method and the pressure-sensitive method can detect the coordinates of a touch input with the electrostatic method and, at the same time, detects the strength of the touch input with the pressure-sensitive method. This type of panel allows the user to perform the "selection operation" by moving the finger with a pressure not exceeding the threshold and, at the same time, to perform the "confirmation operation" by applying a pressure exceeding the threshold. The touch panel 5 sends the detection signal, which represents the coordinates of the detected touch input, to the control unit 10.

The mechanical switches 6 are provided, for example, in the design panel switch incorporated in the instrument panel. The mechanical switches 6 are provided, for example, around the lower display device 4 (see FIG. 5). The mechanical switches 6 include, for example, multimedia system switches, vehicle control system switches, and the top switch (a switch for returning to the independent display mode described later). The multimedia system switches, the switches for operating the multimedia device 2, may include, for example, the map switch for calling a navigation image, the destination switch for calling the operation image for setting a destination, and so on. The vehicle control system switches include the switches for various operations such as the air conditioner operation (air conditioning operation), the travel control mode selection, the traveling assistance device (clearance sonar etc.) setting, the rear seat operation, the electric rear sunshade operation, and so on. The operation signal generated when the user operates the mechanical switches 6 is sent to the control unit 10. Instead of or in addition to the mechanical switches 6, other types of switches, each having the same single function as that of the mechanical switches 6 (non-contact type switches having no moving element), may be provided. Other types of switches may be a pressure sensitive film switch or an electrostatic detection touch type switch.

The control unit 10 is formed by a computer. For example, the control unit 10 is an Electronic Control Unit (ECU). The control unit 10 is connected to the multimedia device 2, upper display device 3, lower display device 4, touch panel 5, and mechanical switches 6 and, via a controller area network (CAN) 30, to the various electronic components inside the vehicle. The electronic components to which the control unit 10 is connected via the CAN 30 include an air conditioner ECU (not shown) for controlling an air conditioner (not shown).

The control unit 10 includes a main CPU (Central Processing Unit) 11, a sub-microcomputer 12, a main storage device 13, an auxiliary storage device 14, and drawing Integrated Circuits (ICs) 16 and 18. The main CPU 11 and the sub-microcomputer 12 may be integrated.

Figure 3:
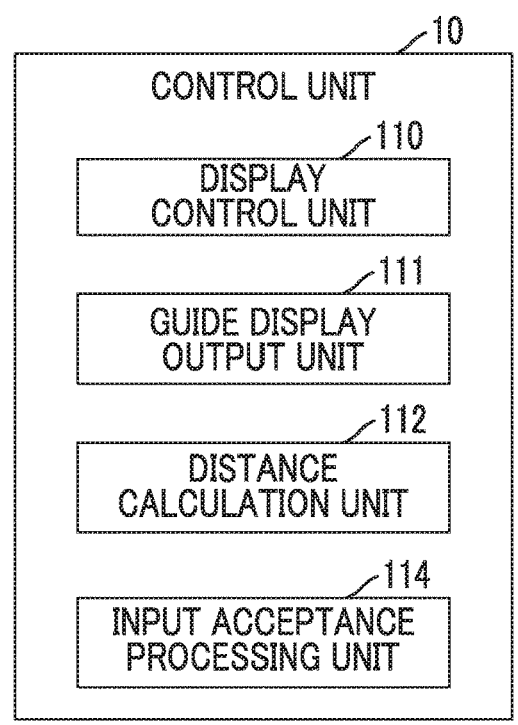
FIG. 3 is a diagram showing an example of functional blocks of a control unit 10.

FIG. 3 is a diagram showing an example of the functional blocks of a control unit 10.

The control unit 10 includes a display control unit 110, a guide display output unit 111, a distance calculation unit 112, and an input acceptance processing unit 114. The display control unit 110 can be implemented by the processing of the drawing IC 16 and the processing of the main CPU 11 (program execution processing). The guide display output unit 111 can be implemented by the processing of the drawing IC 18 and the processing of the main CPU 11 (program execution processing). The distance calculation unit 112 and the input acceptance processing unit 114 can be implemented by the processing (program execution processing) of the main CPU 11 and the sub-microcomputer 12.

The display control unit 110 outputs an image (referred to as "lower image") to the lower display device 4. The lower image includes a user interface image (hereinafter also referred to as "lower GUI image").

One or more functions are associated with the user interface image such as the upper image and the lower GUI image described above. Each of the one or more functions is associated with a predetermined position in the user interface image. A function associated with the user interface image is determined according to the appearance of the image. In other words, when it is desired to associate a certain function with an image, the image usually has an appearance related to the function. For example, in this embodiment, the user interface image has definition parts each associated with an operation input on the touch panel 5 and a function. A definition part is a part in which an operation input that is accepted in the defined part and a function to be implemented in response to the operation input are defined.

Typically, an operation item display is drawn in a definition part. That is, a definition part corresponds to the drawing range of an operation item display to which the characters and a picture indicating the associated function are attached. The user interface image, in which such operation item displays are drawn, can display the associated functions. An operation item display may be in the form a switch; for example, a setting switch for specifying various settings (volume adjustment, temperature adjustment, etc.) of an operation target device such as the multimedia device 2 and an air conditioner (not shown), a switch for performing a specific screen transition, a scroll switch for scrolling the screen or a list, input keys such as keys for letters and numbers, and a selection switch for selecting a list. In addition, an operation item display may be in the form of an icon or a launcher for activating a specific application.

The operation input and the function associated with a definition part are predefined for each lower GUI image and for each definition part that is output to the lower display device 4 (for example, see GUI information shown in FIG. 9. The GUI information shown in FIG. 9 will be described later).

The display control unit 110 has two modes: one is an independent display mode for outputting an independent display mode image and the other is a mirror display mode for outputting a mirror display mode image. In the independent display mode, an independent display mode image is the lower GUI image. In the mirror display mode, a mirror display mode image is the lower GUI image. An example of transition conditions between the independent display mode and the mirror display mode will be described later with reference to FIG. 5.

An independent display mode image is an image independent of the upper image output on the upper display device 3. Accordingly, during the independent display mode, even if the upper image output on the upper display device 3 changes, the independent display mode image does not change due to the change. For example, an independent display mode image is an image that is not output on the upper display device 3. Although there may be only one type of independent display mode image, there is a plurality types of independent display mode images, for example, in this embodiment. From the plurality types of independent display mode images, the user may select an independent display mode image to be output on the lower display device 4. For example, the plurality types of independent display mode images include the images for operating the vehicle control system such as the air conditioner operation image, the travel control mode selection image, the travel assistance device setting image, and the rear seat and the electric rear sunshade operation image. In addition, an independent display mode image may have a layer structure in which the menu image is the home image and, in the lower layer of the home image, various images, such as the air conditioner operation image and the traveling control mode selection image, are prepared in parallel. Furthermore, each of various images, such as the air conditioner operation image, may have a layer structure having further lower-layer images.

Figure 4A:
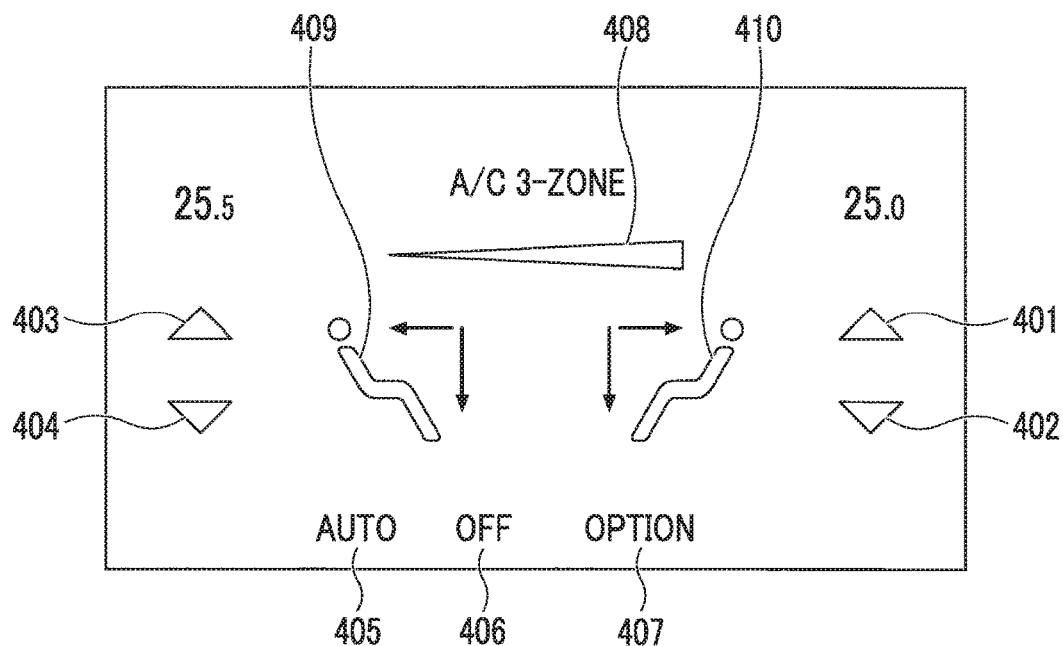
FIG. 4A is a diagram showing an example of an independent display mode image.

Functions different from those related to the upper image are associated with an independent display mode image. In this embodiment, the functions associated with the definition parts in an independent display mode image include various functions of the vehicle control system. For example, the various functions associated with the definition parts of an independent display mode image may include various functions that can be implemented by the vehicle control system switches of the mechanical switches 6 and the further various functions (various functions of the vehicle control system) that cannot be implemented by the vehicle control system switches. FIG. 4A is a diagram showing an example of an independent display mode image. In the example shown in FIG. 4A, the independent display mode image is an air conditioner operation image, in which operation item displays 401 to 410 indicating various associated functions (functions related to the air conditioner operation image) are shown.

A mirror display mode image has the same appearance as that of the upper image being (currently) output to the upper display device 3. Therefore, if the upper image output to the upper display device 3 changes during the mirror display mode, the mirror display mode image changes according to the change. Note that a mirror display mode image can be reduced (or enlarged) at a constant ratio with respect to the upper image according to the difference in screen size between the upper display device 3 and the lower display device 4.

Figure 4B:
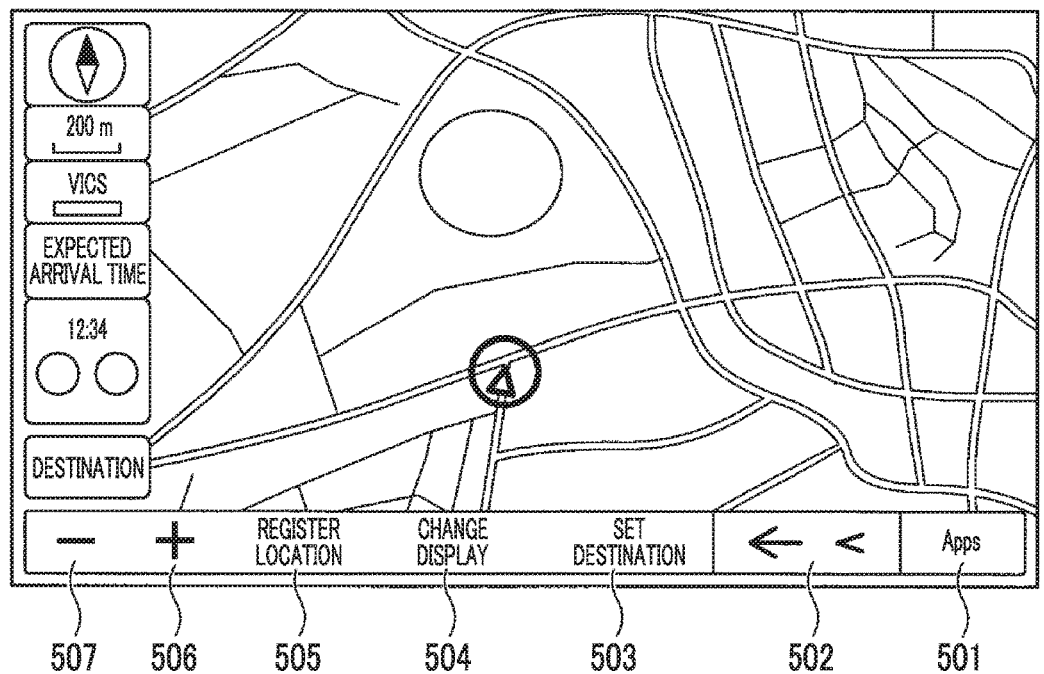
FIG. 4B is a diagram showing an example of a mirror display mode image.

The functions related to the upper image are associated with a mirror display mode image. Since the mirror display mode image and the upper image have the same appearance, the functions related to the upper image and the functions related to the mirror display mode image have the same concept. In this embodiment, the functions associated with the definition parts in a mirror display mode image include various functions implemented by the multimedia device 2. For example, the various functions associated with the definition parts in a mirror display mode image may include various functions that can be implemented by the multimedia system switches of the mechanical switches 6 and further various functions (multimedia system functions) that cannot be implemented by the multimedia system switches. FIG. 4B is a diagram showing an example of a mirror display mode image corresponding to a navigation image. In the example shown in FIG. 4B, the mirror display mode image shows operation item displays 501 to 507 indicating various associated functions (functions related to the navigation image).

A mirror display mode image, which has the same appearance as that of the upper image output to the upper display device 3, can be generated using the video signal that the multimedia device 2 outputs to the upper display device 3. This eliminates the need, or makes it easy, for the display control unit 110 to draw a mirror display mode image, thereby reducing the cost.

The display control unit 110 switches the mode between the independent display mode and the mirror display mode based on a mode switching input from the user. The mode switching input is a predefined input satisfying the transition condition (described later with reference to FIG. 5) between the independent display mode and the mirror display mode. The mode switching input may include any one or any two of a predetermined input by the mechanical switches 6, a predetermined input on the touch panel 5, a predetermined input via voice (a predetermined input recognized by a voice recognition engine), and a predetermined input via gesture using a hand or a finger (a predetermined input recognized by the gesture recognition engine).

FIG. 5 is a state transition diagram showing an example of a transition condition between the independent display mode and the mirror display mode. FIG. 5 shows the upper display device 3, the lower display device 4, and the mechanical switches 6.

The transition condition from the independent display mode to the mirror display mode is satisfied when any one of the following conditions (1) to (2) is satisfied. (1) A drag-down or flick-down operation is detected on the touch panel 5. (2) An operation of a multimedia system switch (e.g. map switch or destination switch) of the mechanical switches 6 is detected.

The transition condition (return condition) from the mirror display mode to the independent display mode is satisfied when any one of the following conditions (11) to (14) is satisfied. (11) The non-operation state has continued for the predetermined time T1. (12) An operation of the vehicle control system switch of the mechanical switches 6 is detected. (13) An operation of the top switch of the mechanical switches 6 is detected. (14) A drag-up or flick-up operation is detected on the touch panel 5.

In this embodiment, the display control unit 110 switches the mode, for example, from the independent display mode to the mirror display mode based on an event (mode switching input) that satisfies one of the conditions (1) to (2) in the independent display mode, as shown in FIG. 5. In addition, the display control unit 110 switches the mode from the mirror display mode to the independent display mode based on an event that satisfies the condition (11) in the mirror display mode. The display control unit 110 also switches the mode from the mirror display mode to the independent display mode based on an event (mode switching input) that satisfies any one of the conditions (12) to (14) in the mirror display mode.

Furthermore, based on the display change command received from the input acceptance processing unit 114 in the independent display mode, the display control unit 110 performs the processing responsive to the display change command. The processing responsive to the display change command is the processing of changing the screen transition, screen scroll, and setting display related to the independent display mode image. The display change command to be sent to the display control unit 110 is generated based on the operation signal of a vehicle control system switch of the mechanical switches 6 or an operation input associated with a definition part in the independent display mode image.

The guide display output unit 111 outputs, based on the coordinates of a touch input on the touch panel 5, a guide display (an example of a predetermined image) to the position that corresponds to the coordinates in the upper image (in the description below, this position is referred to as a "touch coordinate corresponding position in the upper image"). A touch input is an input detected by the touch panel 5. The coordinates of a touch input can be calculated based on the detection signal received from the touch panel 5. The guidance display, a mark or a cursor, is a display indicating the position corresponding to the coordinates of a touch input. By outputting the guidance display, the operability of the remote touchpad type operation can be improved. That is, when performing an operation on the lower display device 4 while watching the upper image on the upper display device 3 (that is, during remote touchpad type operation), the user can know the coordinates of the current touch input on the touch panel 5 based on the position of the guidance display output to the upper display device 3.

Figure 6:
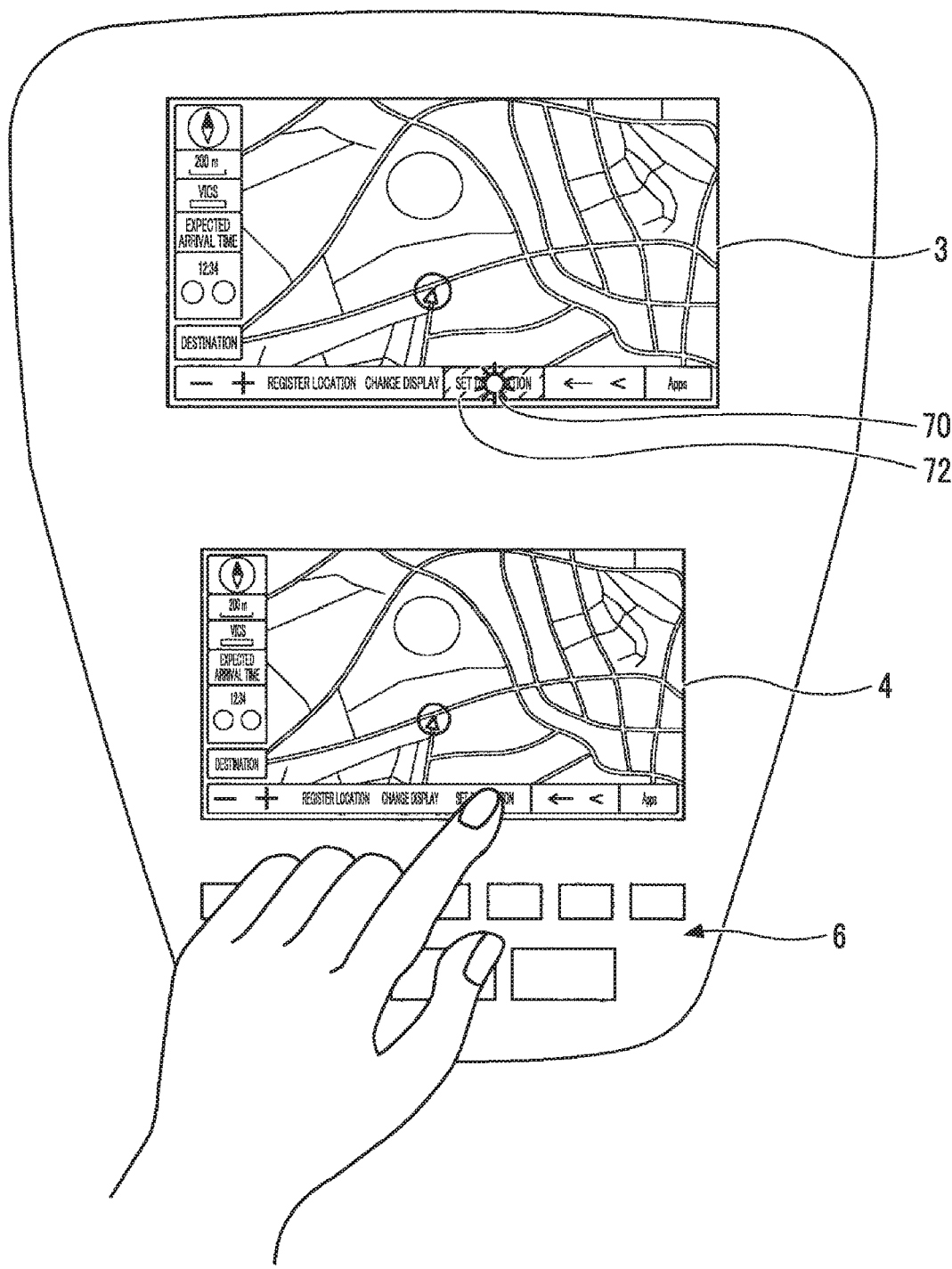
FIG. 6 is a diagram showing an example of a guide display.

In this embodiment, the guide display includes, for example, a mark 70 and a cursor 72 as shown in FIG. 6. In many cases, the mark 70 has the shape of a substantial circle, a polygon, or an arrow. In the example shown in FIG. 6, the mark 70 has the shape imitating the sun. The cursor 72 is a display for emphasizing (highlighting) the operation item display at the position corresponding to the coordinates of a touch input. When outputting the mark 70, the guide display output unit 111 generates a new video signal by superimposing the mark 70 on the upper image based on the video signal received from the multimedia device 2, and then sends the generated video signal to the upper display device 3. When outputting the cursor 72, the guide display output unit 111 generates a new video signal by emphasizing the corresponding operation item display in the upper image based on the video signal received from the multimedia device 2, and then sends the generated image signal to the upper display device 3.

The guide display output unit 111 calculates the touch coordinate corresponding position in the upper image by using a predetermined conversion formula that is based on the relationship between the coordinate system of the touch panel 5 and the coordinate system of the upper image. The relationship between the coordinate system of the touch panel 5 (=the coordinate system of the lower image) and the coordinate system of the upper image is a fixed relationship, and the predetermined conversion formula (matrix) for converting from the coordinate system of the touch panel 5 to the coordinate system of the upper image can be derived beforehand. FIG. 7 shows two coordinate systems; one is the coordinate system of the upper image in which the origin is fixed at the upper left corner of the screen of the upper display device 3 and the other is the coordinate system of the touch panel 5 in which the origin is fixed at the upper left corner of the operation surface of the touch panel 5. In this example, the coordinates (X1, Y1) and the coordinates (x1, y1) are in the correspondence relationship, and the coordinates (x1, y1) are converted to the coordinates (X1, Y1) by the predetermined conversion formula. The operation becomes more intuitive at the remote touchpad operation time when the correspondence relationship between the absolute coordinate systems is used in this way than when the so-called relative coordinate system correspondence is used, thus improving operability.

In the example shown in FIG. 7, the mark 70 is output at the touch coordinate corresponding position (X1, Y1) corresponding to the touch input coordinates (x1, y1) and, at the same time, the cursor 72 is output for the operation item display at the position of the touch coordinate corresponding position (X1, Y1). When the coordinates of the touch input change, the touch coordinate corresponding position (X1, Y1) changes and, at the same time, the output position of the mark 70 in the upper image also changes. When the coordinates of the touch input change, the output state is changed in such a manner that the cursor 72 is output when the mark 70 is on an operation item display but is not output when the mark 70 is not on an operation item display.

The guide display output unit 111 ends the display of the mark 70 and the cursor 72 when the user ends a touch input. That is, when the user ends the touch input on the touch panel 5, the guide display output unit 111 ends the display of the marks 70 and the cursor 72 that have been output up to that time. This makes the operation feeling at the remote touchpad type operation time almost similar to that of the operation time of the "existing single touch-panel equipped display device", providing operability that is familiar to the user who is familiar with the "existing single touch-panel equipped display device". Furthermore, ending the display in this manner also prevents the inconvenience that may be caused when the mark 70 or the cursor 72 is kept output after the touch input is completed (prevents the user from misunderstanding that the mark 70 and the cursor 72 can be moved based on the correspondence relationship in the so-called relative coordinate system).

In addition, when a touch input occurs in such a way that the coordinates are simultaneously become a plurality of points, the guide display output unit 111 outputs the mark 70 at the position corresponding to each of the plurality of coordinates in the upper image. In the description below, this function is referred to as the "multipoint mark output function". A touch input that generates the coordinates in such a way that the coordinates simultaneously become a plurality of points typically occurs when the user touches the touch panel 5 with a plurality of fingers. FIG. 8 is a diagram showing the multipoint mark output function. FIG. 8 shows the case in which, when a touch input occurs in such a way that five coordinates are simultaneously generated (that is, a touch input occurs when the user touches the touch panel 5 with the five fingers with his/her hands opened), the five marks 70 are output, one for each touch coordinate corresponding position in the upper image. As a result, the user can easily know which finger is close to or matches the desired operation item display based on the plurality of marks 70. Accordingly, the multipoint mark output function is suitable when a mirror display mode image having a relatively large number of definition parts (and consequently a relatively large number of operation item displays) is output.

The distance calculation unit 112 calculates the distance between the coordinates at the start of a touch input and the coordinates at the end of the touch input. In the description below, the coordinates at the start of a touch input are referred to as "on-trigger coordinates", the coordinates at the end of a touch input are referred to as "off-trigger coordinates", and the distance between the coordinates at the start of a touch input and the coordinates at the end of the touch input is referred to as the "on-off trigger distance dd". The on-off trigger distance dd can be expressed by the following formula, where the on-trigger coordinates are (x0, y0) and the off-trigger coordinates are (x1, y1). $dd=\sqrt{\{(x1-x0)^2+(y1-y0)^2\}}$ In this case, the on-off trigger distance dd is a linear distance between the two points.

The input acceptance processing unit 114 performs the off-trigger type functional processing in the mirror display mode, based on the off-trigger coordinates of a touch input. The off-trigger type functional processing is processing for executing the function associated with off-trigger coordinates. In this embodiment, the off-trigger type functional processing is performed in the mirror display mode for a definition part with which an off-trigger type input (one type of operation input) is associated in a mirror display mode image.

The off-trigger type input is a type of touch input in which the coordinates at the end of a touch input (off-trigger coordinates) are used as one single input coordinates related to the touch input. Accordingly, a type of operation input such as "a tap" can be an off-trigger type input. On the other hand, a type of input operation, such as a drag, a pinch-in/pinch-out, and a flick, is not an off-trigger type input.

In addition, the input acceptance processing unit 114 performs the off-trigger type functional processing in the independent display mode, based on the off-trigger coordinates of a touch input. In this embodiment, the off-trigger type functional processing is performed similarly in the independent display mode for a definition part with which an off-trigger type input is associated in an independent display mode image.

When an independent display mode image or a mirror display mode image output to the lower display device 4 has a definition part with which a non-off-trigger type input (for example, a drag, a pinch-in/pinch-out, a flick etc.) is associated, the input acceptance processing unit 114 executes the function associated with the definition part, based on a non-off-trigger type input (e.g. a drag, a pinch-in/pinch-out, a flick etc.) associated with the definition part (in the description below, this processing is referred to as "non-off-trigger type functional processing").

As described above, in the mirror display mode, a mirror display mode image, together with the upper image, can function as a GUI related to the multimedia device 2, and the touch panel 5 can function as an operation device for operating the multimedia device 2. Similarly, in the independent display mode, an independent display mode image can function as a GUI of the vehicle control system, and the touch panel 5 can function as an operation device for operating the vehicle control system.

A specific example of the processing of the input acceptance processing unit 114 will be described below with reference to FIG. 9. The input acceptance processing unit 114 performs the off-trigger type functional processing or the non-off-trigger type functional processing based on the GUI information prepared for each independent display mode image and each mirror display mode image. For example, as shown in FIG. 9, the GUI information includes an image ID for identifying each independent display mode image and each mirror display mode image and, for each image ID, the definition part IDs that identify one or more definition parts. The GUI information further includes, for each definition part ID, the position (range) of the definition part, an operation input (type of operation input) associated with the definition part, an operation signal associated with the definition part (that is, the operation signal for implementing the function associated with definition part), and the output destination of the operation signal. In this embodiment, an off-trigger type input is associated, for example, with each definition part where an operation item display, such as operation item displays 501 to 507 (see FIG. 4B), is drawn. In the GUI information, it should be noted that the multimedia device 2 is not defined for the output destination of the operation signal related to an independent display mode image and that the display control unit 110 is not defined for the output destination of the operation signal related to a mirror display mode image. The GUI information is stored in advance, for example, in the main storage device 13.

For example, in FIG. 9, the image ID=00001 is related to a mirror display mode image corresponding to a navigation image. The definition part ID 00001, related to the image ID=00001, is the ID of a definition part (xx10 to xx11, yy10 to yy11) with which an off-trigger type input is associated. This definition part is a square area defined by the X coordinates xx10 to xx11 and the Y coordinates yy10 to yy11 of the screen. The display change command A is associated with the definition part ID00001 as the function. The display change command A is output to the multimedia device 2. Similarly, a flick is accepted for a definition part (xx30 to xx31, yy30 to yy31) with the definition part ID 00003 and, in response to the flick, the downward scroll command B is output to the multimedia device 2. The image ID=00001 has another definition part, not shown, with which an off-trigger type input is associated. The image ID=00002 is related to an independent display mode image. The definition part ID 00002, related to the image ID=00002, is the ID of a definition part (xx20 to xx21, yy20 to yy21) with which an off-trigger type input is associated, and the set value increase command B and the display change command B are associated as the function. The set value increase command B is output to the CAN 30, and the display change command B is output to the display control unit 110. As described above, the input acceptance processing unit 114 performs the off-trigger type functional processing, not for all the definition part IDs defined by the GUI information, but only for a definition part ID for which an "off-trigger type input" is defined as the type of operation input. The following describes the processing with emphasis on the off-trigger type functional processing.

The input acceptance processing unit 114 performs the off-trigger type functional processing in the mirror display mode, based on a touch input in which the on-off trigger distance dd is equal to or smaller than the predetermined value dth. Therefore, in the mirror display mode, the user can implement the function associated with the mirror display mode image by performing a touch input whose on-off trigger distance dd is equal to or smaller than the predetermined value dth.

The predetermined value dth, which is substantially 0, is larger than an error in the detection signal that can appear when the user touches the same position on the touch panel 5 or is larger than a user-unintended slight deviation in a touch position. For example, the predetermined value dth corresponds to the maximum value of distances between the off-trigger coordinates of two or more taps that are assumed to be the taps in the same position on the touch panel 5. The predetermined value dth may be set for the image IDs differently depending on the size and density of each definition part.

In the mirror display mode, the input acceptance processing unit 114 does not perform the off-trigger type functional processing for a touch input whose on-off trigger distance dd is larger than the predetermined value dth. Therefore, in the mirror display mode, for a touch input whose on-off trigger distance dd is larger than the predetermined value dth, the input acceptance processing unit 114 does not perform the function, associated with a definition part, even if the off-trigger coordinates are located in the definition part; instead, the auxiliary storage device 14 substantially invalidates the touch input itself (that is, performs no processing in the same manner as in the non-operation state). This means that, by adjusting the on-off trigger distance dd, the user can prevent the off-trigger type functional processing from being performed for any touch input. For example, when the mark 70 or the cursor 72 is output at a position different from a desired position in the upper image at the start of a touch input, the user may trace the distance larger than the predetermined value dth without leaving the finger from the touch panel to terminate the touch input, thus preventing the touch input from causing the off-trigger type functional processing. In the description below, such a function is referred to as a "touch input cancellation function". When the user starts an operation without looking at the lower display device 4, there is a low possibility that the mark 70 or the cursor 72 is output at a desired position in the upper image at the start of the first touch input. Therefore, this touch input cancellation function is useful when starting an operation without looking at the lower display device 4. On the other hand, the user can look at the mark 70 or the cursor 72, which is output in the upper image, and release the finger (that is, ends the touch input) when the mark 70 or the cursor 72 reaches a desired position. By doing so, the user can easily know the start position of the second touch input that can implement the desired function while using the touch input canceling function. That is, when the user moves his/her finger on the touch panel 5 and knows a desired finger position, he or she may release the finger from the touch panel 5 and then start the second touch input at that position. In this case, there is a high possibility that the mark 70 or the cursor 72 is output at a desired position in the upper image and, if the user releases his/her finger from the touch panel 5, the desired function can be implemented. In this way, the touch input cancellation function, which can also be used as a selection assistance function for selecting a desired definition part, further increases operability. By providing such a touch input cancellation function, a touch input that causes the off-trigger type functional processing in the mirror display mode image is limited to a touch input whose on-off trigger distance dd is equal to or smaller than the predetermined value dth. A touch input whose on-off trigger distance dd is equal to smaller than the predetermined value dth, which is more likely to strongly express the user's operation intention than a touch input whose on-off trigger distance dd is larger than the predetermined value dth, can be suitably used as an input for accepting the user's confirmation intention at a remote touchpad type operation time.

In the independent display mode, the input acceptance processing unit 114 performs the off-trigger type functional processing regardless of the on-off trigger distance dd. Therefore, even if the on-off trigger distance dd becomes larger than the predetermined value dth in the independent display mode, the user can implement the function associated with an independent display mode image. This means that, even if the start position of a touch input cannot be matched with the position of a desired definition part in an independent display mode image due to, for example, a vibration in the vehicle, the user can implement the function associated with the desired definition part, without retrying the touch input, by matching the end position of the touch input with the position of the desired definition part and then releasing the finger. In the independent display mode, the user performs the operation while viewing the lower display device 4 and, therefore, the mark 70 and the cursor 72 described above are not necessary.

In addition, the input acceptance processing unit 114 performs the processing according to an operation signal received from the mechanical switches 6. More specifically, upon receiving an operation signal related to the multimedia system switch, the input acceptance processing unit 114 sends the operation signal to the multimedia device 2. Upon receiving an operation signal related to the vehicle control system switch, the input acceptance processing unit 114 sends the control command, corresponding to the operation signal, to the CAN 30 and, at the same time, sends the display change command, corresponding to the operation signal, to the display control unit 110. The display change command sent to the display control unit 110 instructs on a change to be applied to the screen transition, screen scroll, and setting display related to the independent display mode image. In addition, when the operation signal related to the top switch is received, the input acceptance processing unit 114 generates the display change command that instructs on a screen transition to the home image of the independent display mode image. When the display change command related to the top switch is generated, the input acceptance processing unit 114 sends the generated display change command to the display control unit 110.

According to the on-vehicle operation device in this embodiment described above, the following excellent effects are achieved.

First, in the mirror display mode, while keeping the appearance of the image on the lower display device 4 and the image on the upper display device 3 (the mirror display mode image and the upper image) in the same image state, the on-vehicle operation device according to this embodiment allows the functions, related to the image, to be implemented via an operation on the lower display device 4. Thus, in the mirror display mode, the user can perform the remote touchpad type operation, in which the user can realize the functions (for example, change the setting values etc.), associated with the mirror display mode image that has the same appearance as that of the upper image, via an operation on the lower display device 4 while viewing the upper image output on the upper display device 3.

In addition, in the mirror display mode, the user can perform the operation related to the mirror display mode image (=the operation related to the upper image) via the lower display device 4 while watching the mirror display mode image that has the same appearance as that of the upper image on the upper display device 3. Since the lower display device 4 is provided lower than the upper display device 3 and close to the driver's seat, the operability becomes better than when a touch panel is provided on the upper display device 3 and an operation related to the upper image is performed on the upper display device 3.

In addition, in the mirror display mode, the input acceptance processing unit 114 performs the function, associated with off-trigger coordinates in the mirror display mode image, based on the off-trigger coordinates (off-trigger type functional processing). At this time, the input acceptance processing unit 114 performs the off-trigger type functional processing based on a touch input whose the on-off trigger distance dd is equal to or smaller than the predetermined value dth. Accordingly, when performing an operation on the lower display device 4 while watching an upper image on the upper display device 3, the user can determine whether to end the touch input by looking at the mark 70 or the cursor 72 that is output in the upper image. For example, when the mark 70 or the cursor 72 is output at a desired position in the upper image at the start of a touch input, the user can immediately release the finger to terminate the touch input, thereby performing the off-trigger type functional processing. Therefore, a touch input whose on-off trigger distance dd is equal to or smaller than the predetermined value dth becomes equivalent to an input, which may be used in place of the "depression operation on the remote touchpad", for enabling the selection operation and the confirmation operation at the same time. Therefore, according to this embodiment, it is possible to enhance the operability of the remote touchpad type operation while using the touch panel 5 configured to detect only the coordinates of a touch input.

In addition, since the upper image displayed on the upper display device 3 is a navigation image and so on, it is also possible to use GUI-based software used, for example, on the "existing single touch-panel equipped display device". In addition, since the mirror display mode image has the same appearance as that of the upper image, the mirror display mode image can be generated using the video signal sent to the upper display device 3, as shown in FIG. 1. This makes it possible to reduce the development man-hours of the software related to the generation of a mirror display mode image in the display control unit 110 and the software related to the multimedia device 2.

In addition, in the independent display mode, the user can implement a function associated with an independent display mode image via an operation on the lower display device 4. Therefore, the user can implement a function (an operation of the vehicle control system), which cannot be implemented in the mirror display mode, via an operation on the lower display device 4. In this way, in the independent display mode, the user can perform an operation, associated with an independent display mode image independent of the upper image, on the lower display device 4 while keeping the upper image visible on the high-visibility upper display device 3. Therefore, in the independent display mode, the user can keep a navigation image visible on the upper display device 3, which has better visibility than the lower display device 4, even when any operation is performed on the lower display device 4 during traveling.

As described above, the lower GUI image output to the lower display device 4 selectively includes one of the following two: an independent display mode image independent of the upper image output to the upper display device 3 and a mirror display mode image having the same appearance as that of the upper image displayed on the upper display device 3. Therefore, the user can perform a mode switching input to switch the lower GUI image, which is output to the lower display device 4, from the independent display mode image to the mirror display mode image, thereby improving convenience.

In both the independent display mode and the mirror display mode, the user can implement various functions via an operation on the touch panel 5 of the lower display device 4. Therefore, the upper display device 3 may be used for display only, in which case the cost of the upper display device 3 can be reduced (more specifically, the cost associated with the touch panel is not necessary). Furthermore, the upper display device 3, when used for display only, can also be arranged at a position far from the driver's hand. This arrangement minimizes the difference between the driver's line-of-sight direction toward the upper display device 3 and the driver's line-of-sight direction toward the road ahead while traveling (the amount of change in the driver's line-of-sight from the direction in which the driver sees the road ahead to the direction in which the driver views the upper image on the upper display device 3).

Next, an operation example of the control unit 10 will be described with reference to FIGS. 10 to 12.

Figure 10:
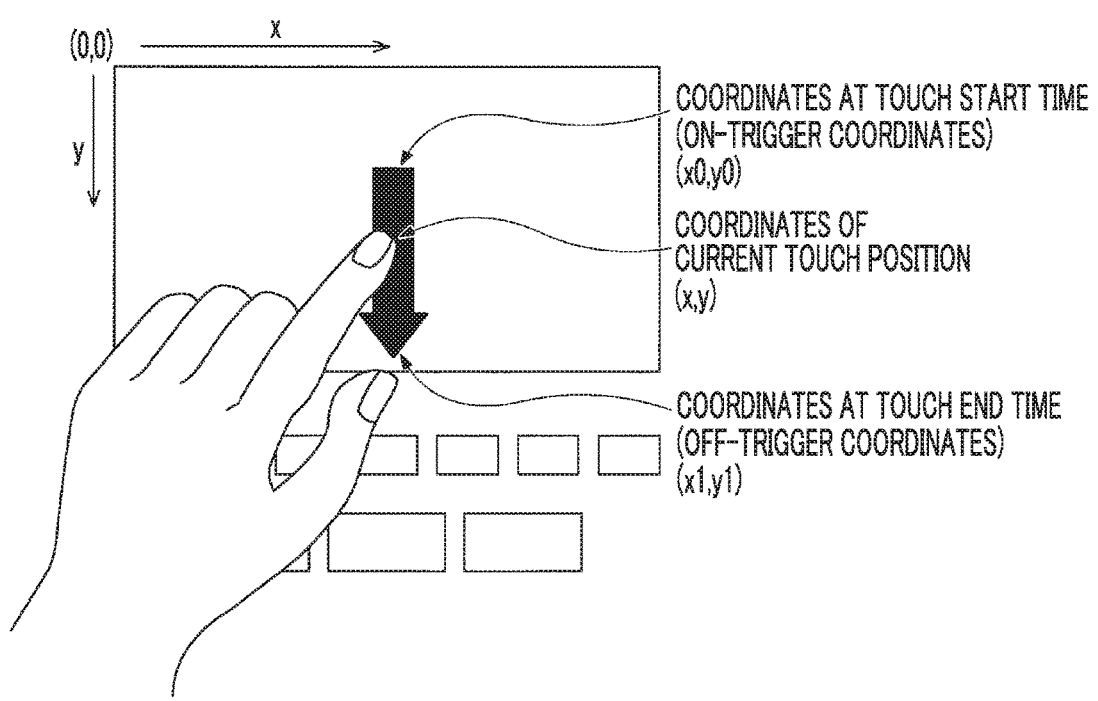
FIG. 10 is a diagram showing various definitions used for the description of an example of operation.
Figure 11:
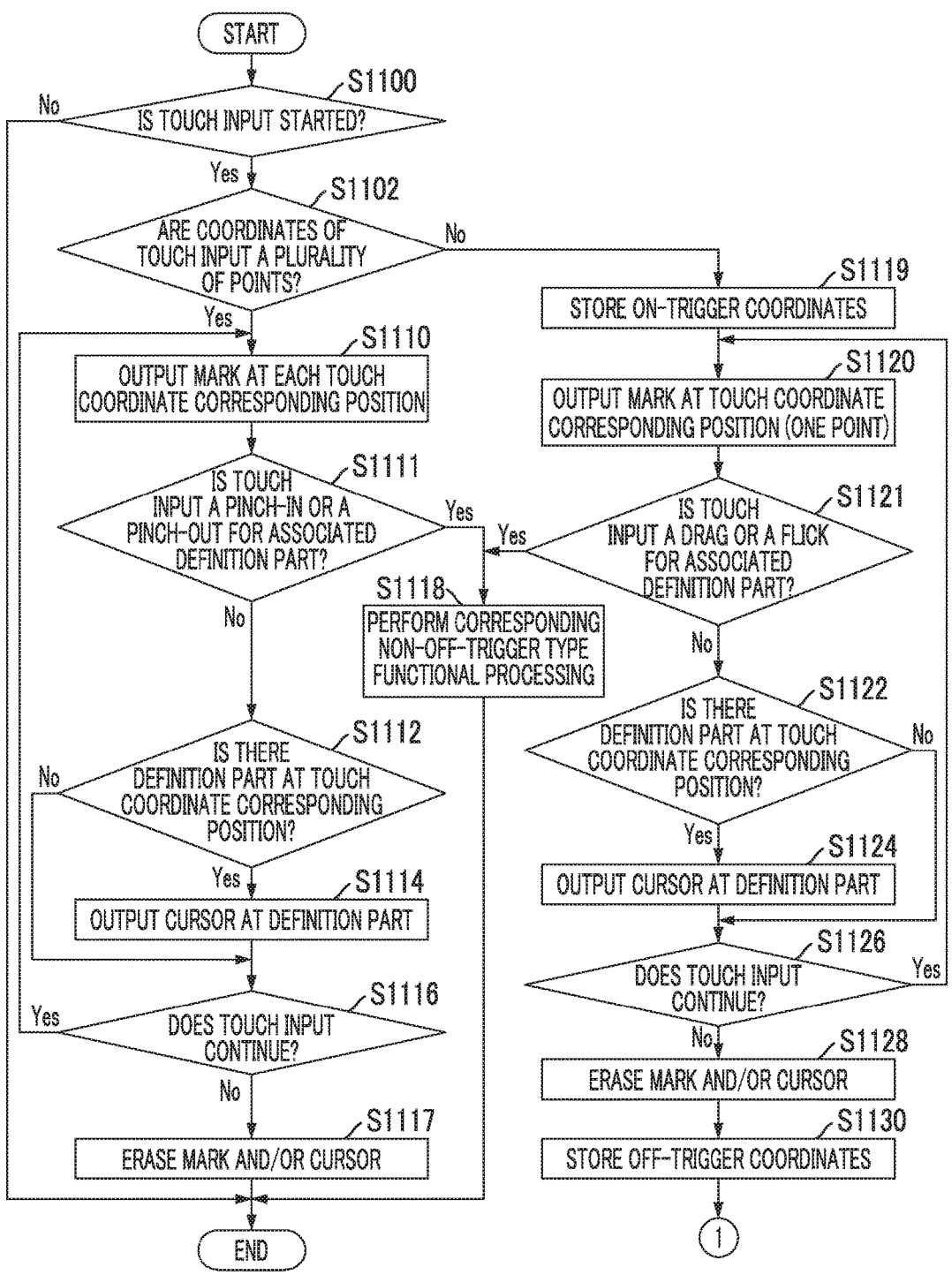
FIG. 11 is a general flowchart (part 1) showing an example of processing executed by an input acceptance processing unit 114 of a control unit 10.
Figure 12:
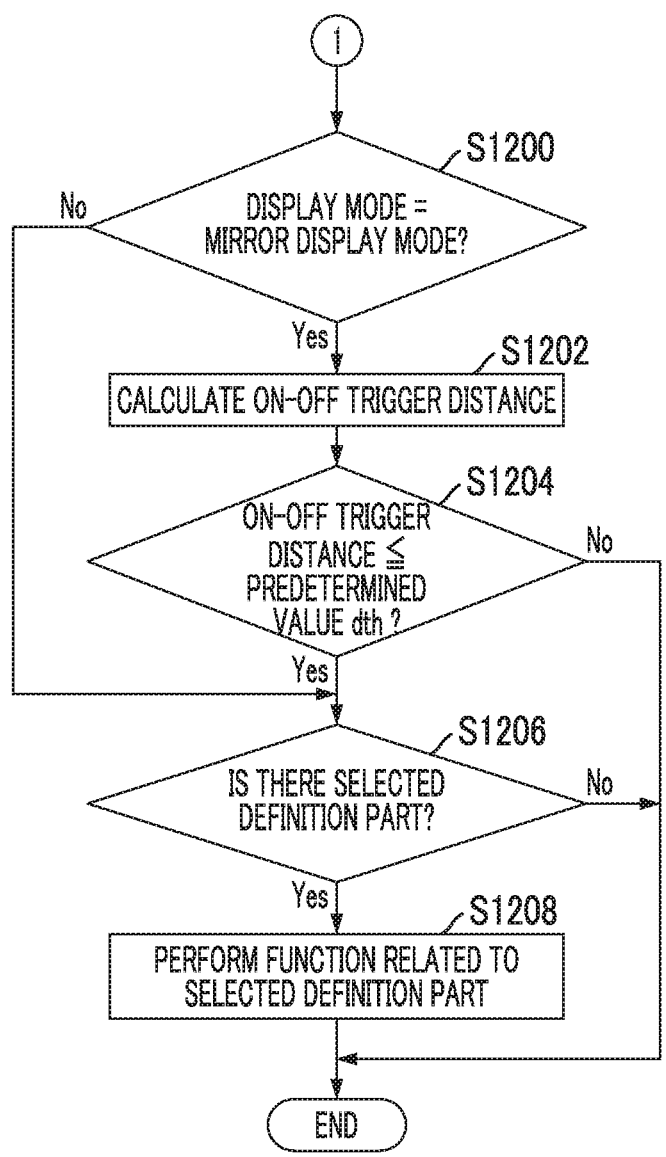
FIG. 12 is a general flowchart (part 2) showing an example of processing executed by an input acceptance processing unit 114 of a control unit 10.

FIG. 10 is a diagram showing the various definitions used for the description of an example of operation, and FIGS. 11 and 12 are general flowcharts showing an example of processing executed by the input acceptance processing unit 114 of the control unit 10.

The x and y coordinates with respect to the screen of the lower display device 4 and their positive directions are defined as shown in FIG. 10. FIG. 10 schematically shows the user's hand moving downwards with a finger on the touch panel 5. In the description below, it is assumed that the coordinates of the current touch position are (x, y), the touch start (on-trigger) position is (x0, y0), and the touch end (off-trigger) position is (x1, y1) as shown in FIG. 10.

The processing shown in FIG. 11 is performed, for example, at predetermined periodic intervals while the ignition switch remains on. The processing shown in FIG. 11 includes a loop executed at predetermined periodic intervals. For example, the predetermined period corresponds to the frame period on the lower display device 4 in this embodiment.

In step S1100, the input acceptance processing unit 114 determines whether a touch input on the touch panel 5 is started. The presence or absence of an input on the touch panel 5 can be determined based on the presence or absence of the detection signal received from the touch panel 5. If the determination result is "YES", the processing proceeds to step S1102; otherwise, the current processing cycle ends.

In step S1102, the input acceptance processing unit 114 determines whether the coordinates of the touch input are a plurality of points. If the determination result is "YES", the processing proceeds to step S1110; otherwise, the processing proceeds to step S1119.

In step S1110, the guide display output unit 111 outputs the mark 70 at each touch coordinate corresponding position in the upper image based on the coordinates of two or more points related to the touch input (see FIG. 8). Unless it is determined affirmatively in step S1111 and the processing proceeds to step S1118, steps S1110, S1112, and S1114 are executed based on each of the coordinates of two or more points obtained at that time until the touch input ends, even when the number of points of the coordinates related to the touch input changes (for example, when the number of points changes to one point) during the continuation of the touch input. If it is determined during the continuation of the touch input that the current touch input is a pinch-in or a pinch-out for a definition part with which a pinch-in or a pinch-out is associated ("YES" in step S1111), the input acceptance processing unit 114 performs the non-off-trigger type functional processing related to the definition part (step S1118).

In step S1112, for each touch coordinate corresponding position in the upper image, the input acceptance processing unit 114 determines whether there is a definition part at the touch coordinate corresponding position, based on the coordinates of two or more points related to the touch input and the GUI information (see FIG. 9) related to the image ID of the currently output image. If the determination result is "YES", the processing proceeds to step S1114; otherwise, the processing proceeds to step S1116.

In step S1114, the guide display output unit 111 outputs the cursor 72 for the definition part at the touch coordinate corresponding position.

In step S1116, the input acceptance processing unit 114 determines whether the touch input on the touch panel 5 continues. If the determination result is "YES", the loop returns to step S1110; otherwise the processing exits the loop and proceeds to step S1117.

In step S1117, the guide display output unit 111 erases the mark 70. Furthermore, when the cursor 72 is displayed, the guide display output unit 111 also erases the cursor 72. Upon completion of step S1117, the current processing cycle is terminated immediately.

In step S1119, the input acceptance processing unit 114 stores coordinates of the current touch input as the on-trigger coordinates related to the current touch input.

In step S1120, the guide display output unit 111 outputs the mark 70 at the touch coordinate corresponding position (one point) in the upper image based on the coordinates of the touch input (one point) (see FIG. 7). Unless it is determined affirmatively in step S1121 and the processing proceeds to step S1118, steps S1120, S1122, and S1124 are executed based on the coordinates (latest coordinates) related to one point at the start of touch input until the touch input ends, even when the number of points of the coordinates related to the touch input changes (for example, when the number of points changes to two or more points) during the continuation of the touch input. If it is determined during the continuation of the touch input that the current touch input is a drag or a flick for a definition part with which a drag or a flick is associated ("YES" in step S1121), the input acceptance processing unit 114 performs the non-off-trigger type functional processing associated with the definition part (step S1118).

In step S1122, the input acceptance processing unit 114 determines whether there is a definition part at the touch coordinate corresponding position in the upper image based on the coordinates of the touch input and the GUI information (see FIG. 9) related to the image ID of the currently output image. If the determination result is "YES", the processing proceeds to step S1124; otherwise, the process proceeds to step S1126.

In step S1124, the guide display output unit 111 outputs the cursor 72 for the definition part at the touch coordination corresponding position (see FIG. 7).

In step S1126, the input acceptance processing unit 114 determines whether the touch input on the touch panel 5 continues. If the determination result is "YES", the loop returns to step S1120; otherwise, the processing exits the loop and proceeds to step S1128.

In step S1128, the guide display output unit 111 erases the mark 70. Furthermore, when the cursor 72 is displayed, the guide display output unit 111 also erases the cursor 72.

In step S1130, the input acceptance processing unit 114 stores coordinates of the current touch input as the off-trigger coordinates related to the current touch input. Upon completion of step S1130, the processing proceeds to step S1200 in FIG. 12.

Referring to FIG. 12, the input acceptance processing unit 114 determines in step S1200 whether the current display mode is the mirror display mode. If the determination result is "YES", the processing proceeds to step S1202; otherwise (that is, the current display mode is the independent display mode), the processing proceeds to step S1206.

In step S1202, the distance calculation unit 112 calculates the on-off trigger distance dd for the current touch input based on on-trigger coordinates and the off-trigger coordinates stored, respectively, in steps S1119 and S1130. The method of calculating the on-off trigger distance dd is as described above In step S1204, the input acceptance processing unit 114 determines whether the on-off trigger distance dd is equal to or smaller than the predetermined value dth based on the on-off trigger distance dd calculated in step S1202. If the determination result is "YES", the processing proceeds to step S1206; otherwise, the current processing cycle is terminated immediately.

In step S1206, the input acceptance processing unit 114 determines whether there is a definition part located at the off-trigger coordinates (hereinafter referred to as "selected definition part"), based on the off-trigger coordinates stored in step S1130 and the GUI information (see FIG. 9) related to the image ID of the currently displayed image. If the determination result is "YES", the processing proceeds to step S1208; otherwise, the current processing cycle is terminated immediately.

In step S1208, the input acceptance processing unit 114 executes the function associated with the selected definition part. At this time, the input acceptance processing unit 114 may instantaneously emphasize the operation item display corresponding to the selected the definition part, or generate a vibration (a vibration generated by a haptic mechanism not shown) on the touch panel 5, to output the information to the user to notify that the selected definition part has been selected and confirmed.

According to the processing shown in FIGS. 11 and 12, the off-trigger type functional processing is performed during the mirror display mode based on a touch input whose on-off trigger distance dd is equal to or smaller than the predetermined value dth. On the other hand, during the independent display mode, an off-trigger type functional process is performed irrespective of the on-off trigger distance dd. Also, the multipoint mark output function is implemented. When the coordinates of a touch input are a plurality of points, the off-trigger type functional processing is not performed. This prevents the off-trigger type functional processing from being performed based on an unintentional operation.

In the embodiment described above, an "independent display mode image" corresponds to an example of a "first image" and a "first mode image" in the claims. A function related to a definition part which is included in the independent display mode image and with which an "off-trigger type input" is associated corresponds to an example of a "first predetermined function" in the claims. An upper image representing a second predetermined function corresponds to an example of a "second image" in the claims, and the second predetermined function corresponds to the function related to a definition part which is included in a mirror display mode image and with which an "off-trigger type input" is associated. Also, off-trigger type functional processing performed in a mirror display mode corresponds to an example of "an off trigger" in the claims. A mirror display mode image having the same appearance as that of an upper image representing the second predetermined function corresponds to another example of the "first image" in the claims and an example of the "second mode image" in the claims.

Although the embodiment has been described in detail, the present disclosure is not limited to a specific embodiment, and various modifications and changes may be added within the scope described in this specification. It is also possible to combine all or a plurality of components of the embodiment described above.

For example, though both the mark 70 and the cursor 72 are output in the embodiment described above, the output of one of them may be omitted.

In the embodiment described above, though the input acceptance processing unit 114 performs the off-trigger type functional processing for a touch input whose on-off trigger distance dd is larger than the predetermined value dth in the independent display mode, the present disclosure is not limited thereto. That is, also in the independent display mode, it is possible, as in the mirror display mode, that the input acceptance processing unit 114 does not perform the off-trigger type functional processing for a touch input whose the on-off trigger distance dd is larger than the predetermined value dth. In such a modification, the same operability can be realized in both the independent display mode and the mirror display mode.

Furthermore, the multipoint mark output function described above may be omitted in the embodiment described above. For example, when the coordinates of a touch input are a plurality of points, it is also possible that the mark 70 is not output at all or that only the coordinates of a predetermined one point are enabled and the mark 70 is output at the point of the coordinates.

Although the mirror display mode and the independent display mode are provided in the embodiment described above, a configuration in which the independent display mode is not provided is also possible.

Figure 13:
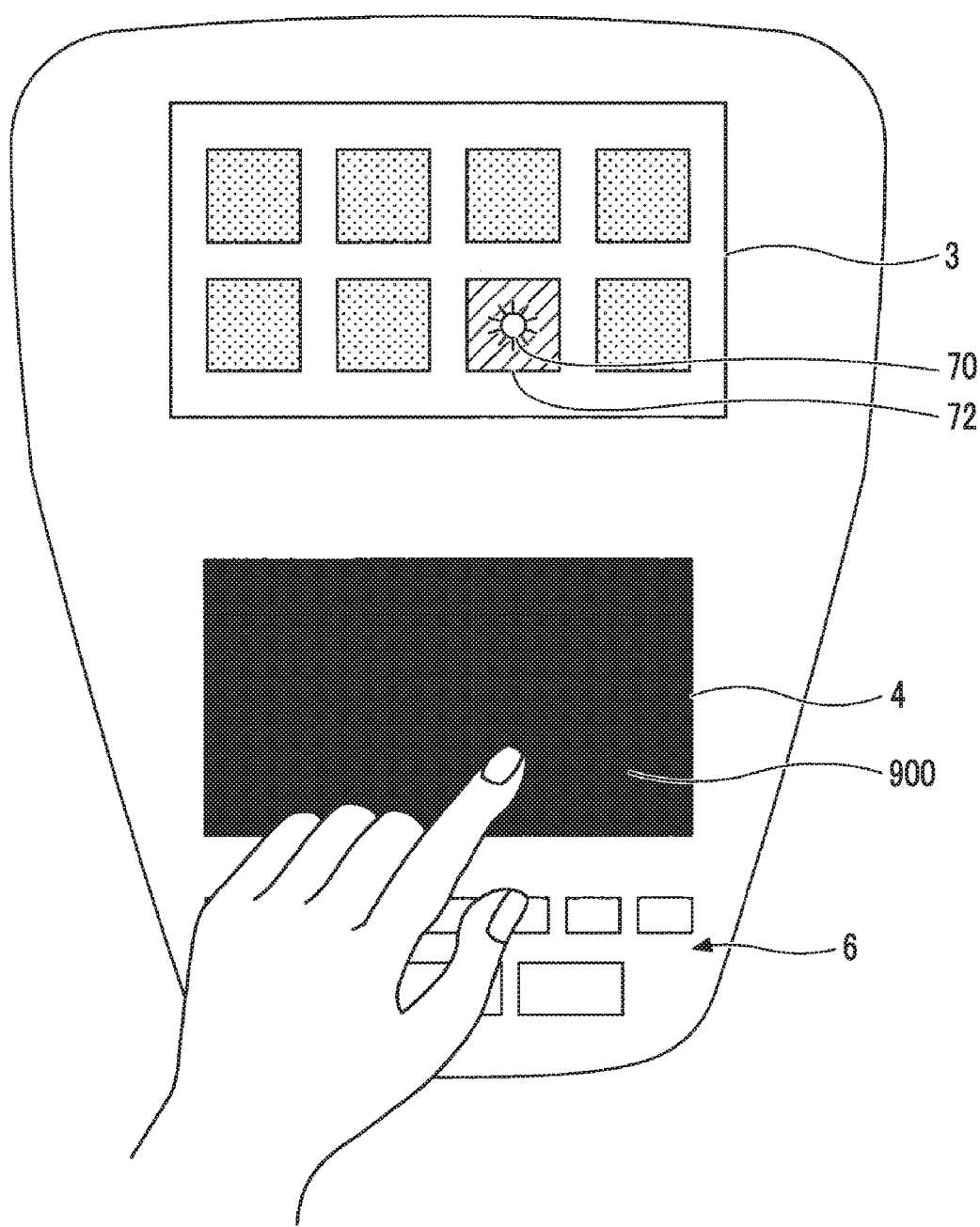
FIG. 13 is a diagram showing a pseudo remote touchpad mode that is used in place of the mirror display mode.

In the embodiment described above, the pseudo remote touchpad mode may be used instead of the mirror display mode. In the pseudo remote touchpad mode, a background image (background image not for the GUI) (another example of the first image), which does not function as a GUI image, is output instead of the mirror display mode image. The background image is, for example, an image including only the background color (for example, an image including only the information, which is not substantially related to the operation, such as an image of black color only). For example, in the example shown in FIG. 13, a background image 900 of black color only is displayed on the lower display device 4. Even in such a case, though the operation that is performed while looking directly at the lower display device 4 is substantially impossible, the pseudo remote touchpad mode allows the user to perform the remote touchpad type operation, thus achieving the effect related to the remote touchpad type operation described above. Although there are two modes, the pseudo-remote touchpad mode and the independent display mode, in this modification, a configuration without the independent display mode is also possible.

Figure 14:
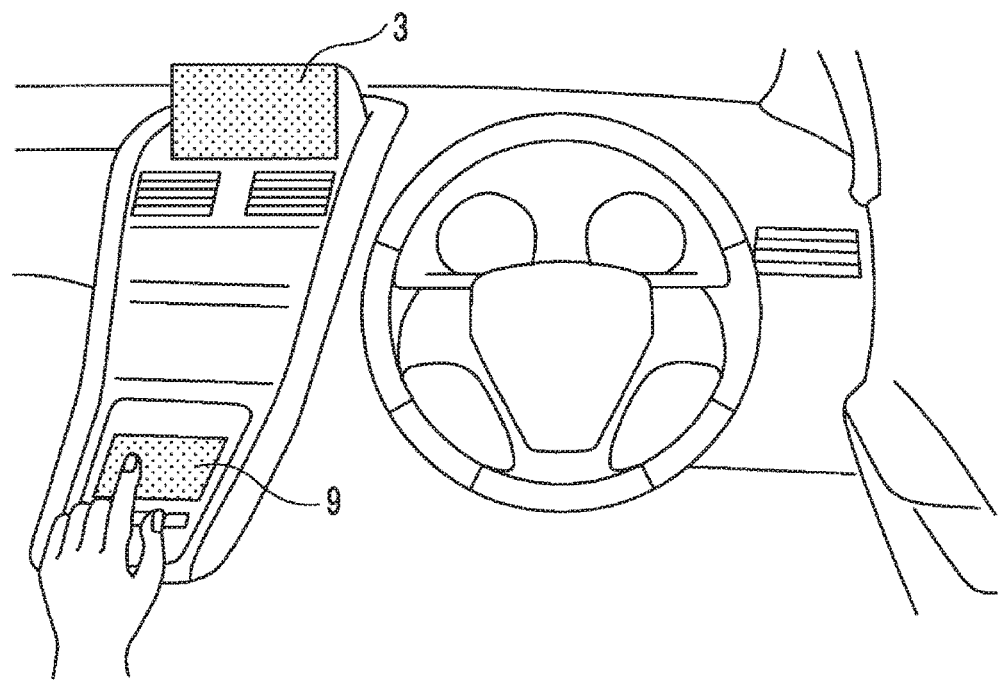
FIG. 14 is a diagram sowing an example of the arrangement of a touchpad.

In the embodiment described above, a touchpad (another example of the operation unit) configured to detect only the coordinates of a touch input may be used instead of the touch panel 5. The touchpad configured to detect only the coordinates of a touch input is, for example, not a touchpad of a depression-operation supporting type. A touchpad of a depression operation non-supporting type is a type of touchpad in which the touchpad itself is not moved up and down but is fixed with respect to the surrounding components. Therefore, a touchpad of a depression-operation non-supporting type does not have a mechanism that allows up and down movement of the touchpad and a unit (tact switch, pressure sensor, etc.) for detecting a depression on the touchpad. In a modification in which a touchpad configured to detect only the coordinates of a touch input is used instead of the touch panel 5, a touch input is an input detected by the touchpad. In such a modification, the detection signal received from the touchpad can be used in the same manner as the detection signal received from the touch panel 5 described above. In this modification, the touchpad eliminates the need for the lower display device 4, the drawing IC 16, and the display control unit 110, thus allowing the touchpad to be arranged in a place where operability is good. For example, FIG. 14 shows an example of a touchpad 9 provided on the console box. The touchpad in such a modification also allows the user to perform the remote touchpad type operation on the upper image via the touchpad, achieving the effect related to the remote touchpad type operation described above.

Figure 15:
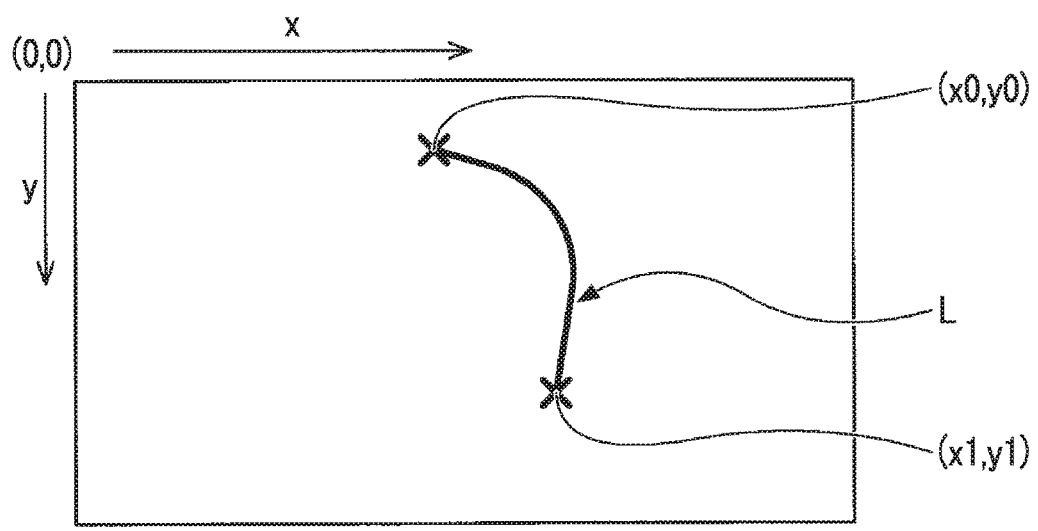
FIG. 15 is a diagram showing an example of the trajectory of coordinates from the start to the end of a touch input.

In the embodiment described above, the on-off trigger distance dd is the distance between the coordinates at the start of a touch input and the coordinates at the end of the touch input (linear distance between two points), but the present disclosure is not limited thereto. For example, the on-off trigger distance dd may be calculated as the distance that follows the trajectory of the coordinates from the start of a touch input to the end of the touch input (that is, the length of the trajectory). For example, FIG. 15 shows a trajectory L as an example of the trajectory of the coordinates from the start to the end of a touch input. In this case, the distance that follows the trajectory L of the coordinates from the start to the end of a touch input can be calculated by accumulating a very short distance per very short time interval (linear distance between two points at each short time interval) from the start to the end of the touch input.

In the embodiment described above, the upper image includes various types of image for use in performing the operation of the multimedia device 2, but the present disclosure is not limited to thereto. For example, the upper image may include only a navigation image. In this case, the images related to the audio device, one of various types of images for the operation of the multimedia device 2, may be included in the independent display mode image. In addition, the upper image may further include images for operating a device other than the multimedia device 2.

Although the upper display device 3 and the lower display device 4 are on-vehicle displays in the embodiment described above, one or both of the upper display device 3 and the lower display device 4 may be implemented by the display device of a user terminal (for example, a smartphone, a tablet, etc.) brought into the vehicle and mounted therein. In this case, communication between the display device of the terminal brought into the vehicle (upper display device 3 and/or the lower display device 4) and the control unit 10 may be carried out by a wireless transceiver unit (Bluetooth communication unit) additionally provided in the control unit 10 or may be carried out by a wired connection. The upper display device 3, when brought into the vehicle, is attached to the upper part of the instrument panel via an attachment. The lower display device 4, when brought into the vehicle, is held, for example, by a cradle installed on the front of the instrument panel. In this case, the attachment and the cradle are provided in such a position that the upper display device 3 is higher than the lower display device 4 and far from the driver's seat.

Although the multimedia device 2 and the control unit 10 are separately provided and the display control unit 110, the guide display output unit 111, the distance calculation unit 112, and the input acceptance processing unit 114 are implemented by the control unit 10 in the embodiment described above, the present disclosure is not limited thereto. For example, the information on a mirror display mode image, included in the GUI information shown in FIG. 9, may be stored in the multimedia device 2; in addition, the off-trigger type functional processing related to a mirror display mode image, which is one of the functions of the input acceptance processing unit 114, may be implemented by computer processing in the multimedia device 2. In this case, in the mirror display mode, the computer in the multimedia device 2 performs the off-trigger type functional processing related to a mirror display mode image, based on the detection signal received from the touch panel 5 and the information on a mirror display mode image included in the GUI information.

What is claimed is:

1. An on-vehicle operation device mounted on a vehicle, the on-vehicle operation device comprising:
   a touch panel configured to detect coordinates of a touch input;
   a first display device;
   a second display device located at a position higher than the touch panel and away from a driver's seat of the vehicle compared to the touch panel; and
   a central processing unit (CPU) configured to:
      control the second display to display a plurality of second images each indicating a second predetermined function,
      calculate a distance or a length of a trajectory between a first position and a second position, the first position corresponding to a first coordinate starting the touch input at the touch panel, the second position corresponding to a second coordinate ending the touch input at the operation unit touch panel, and
      perform an off trigger including execution of the second predetermined function associated with the second position when the distance or the length of the trajectory is equal to or smaller than a predetermined value,
   wherein the CPU is configured not to perform the off trigger when the distance or the length of the trajectory is larger than the predetermined value.

2. The on-vehicle operation device according to claim 1, wherein
   the CPU is configured to control the second display device to display a predetermined image over the second image from the start and until the end of the touch input.

3. The on-vehicle operation device according to claim 2, wherein
   the predetermined image is in a form of a mark or a cursor.

4. The on-vehicle operation device according to claim 2, wherein
   the predetermined image is in a form of a mark and when a plurality of the touch inputs are detected simultaneously, the CPU is configured to output the predetermined image at a position corresponding to each of the plurality of the touch inputs in the second image.

5. The on-vehicle operation device according to claim 1, wherein
   the CPU is configured to calculate a third position corresponding to the first coordinates in the second image and a fourth position corresponding to the second coordinates in the second image, by using a predetermined conversion formula based on a relationship between a coordinate system of the touch panel and a coordinate system of the second image.

6. The on-vehicle operation device according to claim 5, wherein a scale size in a first direction and a second direction of the touch panel is equal to a scale size in the first direction and the second direction of the second display device, the first direction and the second direction crossing each other.

7. The on-vehicle operation device according to claim 1, wherein
   the CPU is configured to output a first image on the first display device.

8. The on-vehicle operation device according to claim 7, wherein
   the CPU has a first mode and a second mode,
   in the first mode, the CPU is configured to output a first mode image as the first image, the first mode image displaying a first predetermined function different from the second predetermined function, the first mode image being independent of the second image output on the second display device,
   in the second mode, the CPU is configured to output a second mode image as the first image, the second mode image having the same appearance as an appearance of the second image output on the second display device, and
   in the second mode, the CPU is configured to perform the off trigger when the distance or the length of the trajectory is equal to or smaller than the predetermined value, and is configured not to perform the off trigger when the distance or the length of the trajectory is larger than the predetermined value.

9. The on-vehicle operation device according to claim 8, wherein in the first mode, the CPU is configured to perform the first predetermined function associated with the second coordinates based on the second coordinates.

10. The on-vehicle operation device according to claim 1, wherein the second images includes a navigation image.

* * * * *